United States Patent
Patel et al.

(10) Patent No.: US 10,278,167 B2
(45) Date of Patent: Apr. 30, 2019

(54) DOWNLINK CONTROL CHANNEL STRUCTURE FOR LOW LATENCY APPLICATIONS

(71) Applicant: QUALCOMM Incorporated, San Diego, CA (US)

(72) Inventors: Shimman Arvind Patel, San Diego, CA (US); Wanshi Chen, San Diego, CA (US); Seyedkianoush Hosseini, San Diego, CA (US); Jing Sun, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/443,938

(22) Filed: Feb. 27, 2017

(65) Prior Publication Data
US 2018/0049191 A1    Feb. 15, 2018

Related U.S. Application Data

(60) Provisional application No. 62/374,607, filed on Aug. 12, 2016.

(51) Int. Cl.
*H04W 4/00* (2018.01)
*H04W 72/04* (2009.01)
(Continued)

(52) U.S. Cl.
CPC ............ *H04W 72/042* (2013.01); *H04J 1/00* (2013.01); *H04L 1/1887* (2013.01);
(Continued)

(58) Field of Classification Search
CPC .................. H04W 72/0446; H04W 72/042
See application file for complete search history.

(56) References Cited

U.S. PATENT DOCUMENTS 9,967,888 B1    5/2018 Zappaterra et al.
2010/0069081 A1    3/2010 Mitra et al.
(Continued)

FOREIGN PATENT DOCUMENTS

WO    WO-2016053844 A1    4/2016

OTHER PUBLICATIONS

Ericsson: "Multiplexing sPDCCH with sPDSCH/PDSCH," 3GPP Draft, R1-1708864, 3rd Generation Partnership Project (3GPP), Mobile Competence Centre, 650, Route Des Lucioles; F-06921 Sophia-Antipolis Cedex, France, vol. RAN WG1, Hangzhou, 20170515-20170519; May 14, 2017 (May 14, 2017), 6 Pages, XP051274047, Retrieved from the Internet: URL: http://www.3gpp.org/ftp/Meetings_3GPP_SYNC/RAN1/Docs/ [retrieved on May 14, 2017].
(Continued)

*Primary Examiner* — Clemence S Han
(74) *Attorney, Agent, or Firm* — Holland & Hart LLP

(57) ABSTRACT

Methods, systems, and devices for wireless communication are described. In one example, an indication in a first control message in a control region of a first transmission time interval (TTI) identifies a data region of the first TTI. A data region of the second TTI may be identified based on a grant of resources received in a second control message of a second TTI, where the data region of the first TTI and the control region of the second TTI are frequency division multiplexed with the data region of the second TTI. Other examples include a downlink grant at the beginning of a control region and uplink grants at the end of the control region. In other examples, a downlink grant for a user equipment (UE) may include an indication of resources allocated to the UE in that resource block and a second resource block.

25 Claims, 20 Drawing Sheets

(51) Int. Cl.
*H04J 1/00* (2006.01)
*H04L 12/26* (2006.01)
*H04L 5/00* (2006.01)
*H04L 1/18* (2006.01)

(52) U.S. Cl.
CPC .......... *H04L 1/1896* (2013.01); *H04L 5/0053* (2013.01); *H04L 5/0091* (2013.01); *H04L 43/0847* (2013.01); *H04W 72/0446* (2013.01); *H04W 72/0453* (2013.01)

(56) References Cited

U.S. PATENT DOCUMENTS

| | | | |
|---|---|---|---|
| 2012/0170510 | A1 | 7/2012 | Kim et al. |
| 2013/0034072 | A1* | 2/2013 | Kim .................. H03M 13/3738 370/329 |
| 2013/0188577 | A1 | 7/2013 | Papasakellariou et al. |
| 2013/0301524 | A1 | 11/2013 | Xu et al. |
| 2014/0328260 | A1 | 11/2014 | Papasakellariou et al. |
| 2015/0009953 | A1 | 1/2015 | Park et al. |
| 2015/0326306 | A1 | 11/2015 | Difazio et al. |
| 2015/0334685 | A1 | 11/2015 | Ji et al. |
| 2016/0014753 | A1 | 1/2016 | Wu et al. |
| 2016/0020891 | A1 | 1/2016 | Jung et al. |
| 2016/0088604 | A1 | 3/2016 | Patel et al. |
| 2016/0095105 | A1 | 3/2016 | Chen et al. |
| 2016/0095137 | A1 | 3/2016 | Chen et al. |
| 2016/0128095 | A1 | 5/2016 | Damnjanovic et al. |
| 2016/0234823 | A1 | 8/2016 | Rudolf et al. |
| 2016/0270038 | A1 | 9/2016 | Papasakellariou |
| 2017/0374638 | A1 | 12/2017 | Han et al. |
| 2018/0041325 | A1 | 2/2018 | Lee et al. |
| 2018/0049163 | A1 | 2/2018 | Patel et al. |
| 2018/0049197 | A1 | 2/2018 | Patel et al. |
| 2018/0109353 | A1 | 4/2018 | Kwak et al. |

OTHER PUBLICATIONS

Ericsson: "sPDCCH Search Space Design," 3GPP Draft; R1-165293, 3rd Generation Partnership Project (3GPP), Mobile Competence Centre; 650, Route Des Lucioles; F-06921 Sophia-Antipolis Cedex; France; vol. RAN WG1, no. Nanjing, P.R. China; 20160523-20160527; May 13, 2016 (May 13, 2016), XP051096743, Retrieved from the Internet: URL:http://www.3gpp.org/ftp/tsg_ran/WG1_RL1/TSGR1_85/Docs/, [retrieved on May 13, 2016], 6 pages.

Intel Corporation: "Consideration on S-PDCCH Design for Latency Reduction," 3GPP Draft; R1-164161, 3rd Generation Partnership Project (3GPP), Mobile Competence Centre; 650, Route Des Lucioles; F-06921 Sophia-Antipolis Cedex; France; vol. RAN WG1, no. Nanjing, China; 20160523-20160527; May 14, 2016 (May 14, 2016), 5 Pages, XP051096557, Retrieved from the Internet: URL:http://www.3gpp.org/ftp/tsg_ran/WG1_RL1/TSGR1_85/Docs/, [retrieved on May 14, 2016].

International Search Report and Written Opinion—PCT/US2017/044410—ISA/EPO—dated Sep. 29, 2017.

Nokia Networks et al: "Considerations on Required Downlink Physical Layer Enhancements for Shorter TTI," 3GPP Draft; R1-160786, 3rd Generation Partnership Project (3GPP), Mobile Competence Centre; 650, Route Des Lucioles; F-06921, Sophia-Antipolis Cedex; France, vol. RAN WG1, no. St. Julian's, Malta; 20160215-20160219, Feb. 14, 2016, XP051054113, URL:http://www.3gpp.org/ftp/Meetings_3GPP_SYNC/RAN1/Docs, pp. 1-7.

Qualcomm Incorporated: "Downlink Design for Shortened TTI", 3GPP TSG RAN WG1 #86, R1-166309, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 13, 2016, XP051132725, Retrieved from the Internet: URL:http://www.3gpp.org/ftp/tsg_ran/WG1_RL1/TSGR1_86/Docs/, 14 pages.

Qualcomm Incorporated: "DL Channel Design for Shortened TTI," 3GPP Draft; R1-164458, 3rd Generation Partnership Project (3GPP), Mobile Competence Centre; 650, Route Des Lucioles; F-06921 Sophia-Antipolis Cedex; France, vol. RAN WG1, no. Nanjing, China; 20160523-20160527, May 14, 2016, XP051096436, URL:http://www.3gpp.org/ftp/tsg_ran/WG1_RL1/TSGR1_85/Docs/, pp. 1-7.

ZTE: "Downlink Control Channels for Shortened TTI", 3GPP Draft; R1-162405, 3rd Generation Partnership Project (3GPP), Mobile Competence Centre, 650, Route Des Lucioles, F-06921, Sophia-Antipolis Cedex, Fran, vol. RAN WG1, no. Busan, Korea; 20160411-20160415, Apr. 2, 2016, XP051080178, URL:http://www.3gpp.org/ftp/tsg_ran/WG1_RL1/1/TSGR1_84b/Docs, pp. 1-7.

ZTE et al., "Discussion on sPDCCH for shortened TTI", 3GPP TSG RAN WG1 Meeting #85, R1-164639, May 14, 2016, 9 pages, XP051096370, Retrieved from the Internet: URL:http://www.3gpp.org/ftp/tsg_ran/WG1_RL1/TSGR1_85/Docs/ [retrieved on May 14, 2016].

* cited by examiner

DOWNLINK CONTROL CHANNEL STRUCTURE FOR LOW LATENCY APPLICATIONS

CROSS REFERENCES

The present application for patent claims priority to U.S. Provisional Patent Application No. 62/374,607, entitled "Downlink Control Channel Structure For Low Latency Applications," filed Aug. 12, 2016, assigned to the assignee hereof.

BACKGROUND

The following relates generally to wireless communication, and more specifically to a downlink control channel structure for low latency applications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be known as user equipments (UEs).

Wireless multiple-access technologies have been adopted in various telecommunication standards to provide a common protocol that enables different wireless devices to communicate on a municipal, national, regional, and even global level. LTE is an example of a telecommunication standard. LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

A base station may transmit to one or more UEs using a transmission time interval (TTI) that is reduced in length. Such a TTI may be referred to as a shortened TTI (sTTI) and a user receiving a sTTI may be a low latency user. A sTTI may be divided into a number of resource blocks across a system bandwidth, and each of the resource blocks may be allocated to a UE by a base station. The base station may transmit control information or a control message in a first portion of the resource block to provide the resource allocations. A low latency user may attempt to decode the control information in the resource block. As sTTIs become shorter, it is ever more important to reduce the control overhead. Thus, it is desirable to efficiently communicate control information, and minimize the amount of processing time required for a UE to receive and decode the control information.

SUMMARY

A base station may indicate time and frequency resources for transmission of a low latency physical downlink control channel (sPDCCH) to a user equipment (UE). A first transmission time interval (TTI) may include a control region, for example, a physical downlink control channel (PDCCH) that includes an indication of a data region within the first TTI. The data region of the first TTI may be for a physical downlink shared channel (PDSCH), narrowband internet-of-things (NB-IOT) type transmission, or common signaling transmission transmitted by a base station. The first TTI may overlap at least in part with a second TTI. The second TTI may be a shortened TTI (sTTI) made up of one or more resource blocks for low latency transmissions, where the data region within the first TTI punctures or otherwise falls within one or more of the resource blocks of the second TTI. A control region of the second TTI may be a sPDCCH. The control region of the PDCCH may include a control message that has a grant of downlink resources for the low latency UE, where the grant indicates a data region of a resource block of the second TTI such that the indicated data region is frequency division multiplexed with the data region of the first TTI. The base station may identify the data region of the first TTI and the data region for the receiving low latency UE, and rate match around the data region of the first TTI to receive low latency data in the data region of the second TTI.

In other examples, a downlink grant transmitted in the control region of a resource block may be for both the resource block in which the downlink grant is sent by a base station and, for a second resource block within the same TTI. In some cases, the downlink grant may include an indication to the UE, such as a number of bits to inform the UE that the downlink grant is also for the UE to receive data in a data region of one or more of the other resource blocks in the TTI, in addition to receiving data in the data region of the resource block in which the downlink grant was received.

The control region for the low latency UE may also include one or more uplink grants. In some cases, at least one of the uplink grants may be for the same UE as was the previously indicated downlink grant. In some other cases, the one or more uplink grants may be for different UEs. The downlink grant may be at the beginning of the control region, for example, at a first boundary of the control region, and the one or more uplink grants may be at the end of the control region, for example, at a second boundary of the control region. An unused portion of the control region may be reallocated to the data region. An indication of the start of the uplink grants may be provided in the downlink grant to allow the UE to identify the reallocated data region within the control region.

A method of wireless communication is described. The method may include receiving a first control message within a control region of a first TTI that has a first duration, identifying a data region of the first TTI based at least in part on an indication received in the first control message, receiving a second control message within a control region of a second TTI that has a second duration that is less than the first duration, wherein the first TTI and the second TTI at least partially overlap in time, and receiving data in a data region of the second TTI based at least in part on a grant of resources received in the second control message, wherein the data region of the first TTI is frequency division multiplexed with the data region of the second TTI, and wherein the control region of the second TTI is frequency division multiplexed with the data region of the second TTI.

An apparatus for wireless communication is described. The apparatus may include means for receiving a first control message within a control region of a first TTI that has a first duration, means for identifying a data region of the first TTI based at least in part on an indication received in the first control message, means for receiving a second control message within a control region of a second TTI that has a second duration that is less than the first duration, wherein the first TTI and the second TTI at least partially overlap in time, and means for receiving data in a data region of the second TTI based at least in part on a grant of resources received in the second control message, wherein the data region of the first TTI is frequency division multiplexed with the data region of the second TTI, and wherein the control region of the second TTI is frequency division multiplexed with the data region of the second TTI.

Another apparatus for wireless communication is described. The apparatus may include a processor, memory in electronic communication with the processor, and instructions stored in the memory. The instructions may be operable to cause the processor to receive a first control message within a control region of a first TTI that has a first duration, identify a data region of the first TTI based at least in part on an indication received in the first control message, receive a second control message within a control region of a second TTI that has a second duration that is less than the first duration, wherein the first TTI and the second TTI at least partially overlap in time, and receive data in a data region of the second TTI based at least in part on a grant of resources received in the second control message, wherein the data region of the first TTI is frequency division multiplexed with the data region of the second TTI, and wherein the control region of the second TTI is frequency division multiplexed with the data region of the second TTI.

A non-transitory computer readable medium for wireless communication is described. The non-transitory computer-readable medium may include instructions operable to cause a processor to receive a first control message within a control region of a first TTI that has a first duration, identify a data region of the first TTI based at least in part on an indication received in the first control message, receive a second control message within a control region of a second TTI that has a second duration that is less than the first duration, wherein the first TTI and the second TTI at least partially overlap in time, and receive data in a data region of the second TTI based at least in part on a grant of resources received in the second control message, wherein the data region of the first TTI is frequency division multiplexed with the data region of the second TTI, and wherein the control region of the second TTI is frequency division multiplexed with the data region of the second TTI.

Another method of wireless communication is described. The method may include receiving a control message within a control region of a TTI, identifying a downlink resource grant for the UE at a first position of the control region that is defined relative to a first boundary of the control region, the downlink resource grant indicating resources assigned to the UE in a data region of the TTI, and monitoring for an uplink resource grant for the UE at a second position of the control region that is defined relative to a second boundary of the control region.

Another apparatus for wireless communication is described. The apparatus may include means for receiving a control message within a control region of a TTI, means for identifying a downlink resource grant for the UE at a first position of the control region that is defined relative to a first boundary of the control region, the downlink resource grant indicating resources assigned to the UE in a data region of the TTI, and means for monitoring for an uplink resource grant for the UE at a second position of the control region that is defined relative to a second boundary of the control region.

Another apparatus for wireless communication is described. The apparatus may include a processor, memory in electronic communication with the processor, and instructions stored in the memory. The instructions may be operable to cause the processor to receive a control message within a control region of a TTI, identify a downlink resource grant for the UE at a first position of the control region that is defined relative to a first boundary of the control region, the downlink resource grant indicating resources assigned to the UE in a data region of the TTI, and monitor for an uplink resource grant for the UE at a second position of the control region that is defined relative to a second boundary of the control region.

Another non-transitory computer readable medium for wireless communication is described. The non-transitory computer-readable medium may include instructions operable to cause a processor to receive a control message within a control region of a TTI, identify a downlink resource grant for the UE at a first position of the control region that is defined relative to a first boundary of the control region, the downlink resource grant indicating resources assigned to the UE in a data region of the TTI, and monitor for an uplink resource grant for the UE at a second position of the control region that is defined relative to a second boundary of the control region.

Another method of wireless communication is described. The method may include receiving a control message within a control region of a first resource element block of a TTI, wherein the control message includes one or more resource allocation bits, receiving data in a first data region of the first resource element block based at least in part on the one or more resource allocation bits, determining that a second data region of a second resource element block of the TTI is allocated to the UE based at least in part on the one or more resource allocation bits, and receiving data in the second data region based at least in part on the determination.

Another apparatus for wireless communication is described. The apparatus may include means for receiving a control message within a control region of a first resource element block of a TTI, wherein the control message includes one or more resource allocation bits, means for receiving data in a first data region of the first resource element block based at least in part on the one or more resource allocation bits, means for determining that a second data region of a second resource element block of the TTI is allocated to the UE based at least in part on the one or more resource allocation bits, and means for receiving data in the second data region based at least in part on the determination.

Another apparatus for wireless communication is described. The apparatus may include a processor, memory in electronic communication with the processor, and instructions stored in the memory. The instructions may be operable to cause the processor to receive a control message within a control region of a first resource element block of a TTI, wherein the control message includes one or more resource allocation bits, receive data in a first data region of the first resource element block based at least in part on the one or more resource allocation bits, determine that a second data region of a second resource element block of the TTI is allocated to the UE based at least in part on the one or more resource allocation bits, and receive data in the second data region based at least in part on the determination.

Another non-transitory computer readable medium for wireless communication is described. The non-transitory computer-readable medium may include instructions operable to cause a processor to receive a control message within a control region of a first resource element block of a TTI, wherein the control message includes one or more resource allocation bits, receive data in a first data region of the first resource element block based at least in part on the one or more resource allocation bits, determine that a second data region of a second resource element block of the TTI is allocated to the UE based at least in part on the one or more resource allocation bits, and receive data in the second data region based at least in part on the determination.

Another method of wireless communication is described. The method may include transmitting a first control message within a control region of a first TTI that has a first duration, wherein the control region of the first TTI includes an indication to be used by a UE to identify a data region within the first TTI, transmitting data in a data region of a second TTI that has a second duration that is less than the first duration, wherein the first TTI and the second TTI at least partially overlap in time, wherein the data region of the first TTI is frequency division multiplexed with the data region of the second TTI, and wherein the control region of the second TTI is frequency division multiplexed with the data region of the second TTI, and transmitting a second control message within a control region of the second TTI, wherein the second control message includes a grant of resources for the transmitted data in the data region of the second TTI, and wherein a location of the control region of the second TTI is indicated in the first control message.

Another apparatus for wireless communication is described. The apparatus may include means for transmitting a first control message within a control region of a first TTI that has a first duration, wherein the control region of the first TTI includes an indication to be used by a UE to identify a data region within the first TTI, means for transmitting data in a data region of a second TTI that has a second duration that is less than the first duration, wherein the first TTI and the second TTI at least partially overlap in time, wherein the data region of the first TTI is frequency division multiplexed with the data region of the second TTI, and wherein the control region of the second TTI is frequency division multiplexed with the data region of the second TTI, and means for transmitting a second control message within a control region of the second TTI, wherein the second control message includes a grant of resources for the transmitted data in the data region of the second TTI, and wherein a location of the control region of the second TTI is indicated in the first control message.

Another apparatus for wireless communication is described. The apparatus may include a processor, memory in electronic communication with the processor, and instructions stored in the memory. The instructions may be operable to cause the processor to transmit a first control message within a control region of a first TTI that has a first duration, wherein the control region of the first TTI includes an indication to be used by a UE to identify a data region within the first TTI, transmit data in a data region of a second TTI that has a second duration that is less than the first duration, wherein the first TTI and the second TTI at least partially overlap in time, wherein the data region of the first TTI is frequency division multiplexed with the data region of the second TTI, and wherein the control region of the second TTI is frequency division multiplexed with the data region of the second TTI, and transmit a second control message within a control region of the second TTI, wherein the second control message includes a grant of resources for the transmitted data in the data region of the second TTI, and wherein a location of the control region of the second TTI is indicated in the first control message.

Another non-transitory computer readable medium for wireless communication is described. The non-transitory computer-readable medium may include instructions operable to cause a processor to transmit a first control message within a control region of a first TTI that has a first duration, wherein the control region of the first TTI includes an indication to be used by a UE to identify a data region within the first TTI, transmit data in a data region of a second TTI that has a second duration that is less than the first duration, wherein the first TTI and the second TTI at least partially overlap in time, wherein the data region of the first TTI is frequency division multiplexed with the data region of the second TTI, and wherein the control region of the second TTI is frequency division multiplexed with the data region of the second TTI, and transmit a second control message within a control region of the second TTI, wherein the second control message includes a grant of resources for the transmitted data in the data region of the second TTI, and wherein a location of the control region of the second TTI is indicated in the first control message.

Another method of wireless communication is described. The method may include generating a downlink resource grant that indicates resources assigned to a UE in a data region of a TTI and generating an uplink resource grant for the UE and transmitting a control message within a control region of the TTI, wherein the control message includes the downlink resource grant at a first position of the control region that is defined relative to a first boundary of the control region and the uplink resource grant at a second position of the control region that is defined relative to a second boundary of the control region.

Another apparatus for wireless communication is described. The apparatus may include means for generating a downlink resource grant that indicates resources assigned to a UE in a data region of a TTI, means for generating an uplink resource grant for the UE and means for transmitting a control message within a control region of the TTI, wherein the control message includes the downlink resource grant at a first position of the control region that is defined relative to a first boundary of the control region and the uplink resource grant at a second position of the control region that is defined relative to a second boundary of the control region.

Another apparatus for wireless communication is described. The apparatus may include a processor, memory in electronic communication with the processor, and instructions stored in the memory. The instructions may be operable to cause the processor to generate a downlink resource grant that indicates resources assigned to a UE in a data region of a TTI, generate an uplink resource grant for the UE and transmit a control message within a control region of the TTI, wherein the control message includes the downlink resource grant at a first position of the control region that is defined relative to a first boundary of the control region and the uplink resource grant at a second position of the control region that is defined relative to a second boundary of the control region.

Another non-transitory computer readable medium for wireless communication is described. The non-transitory computer-readable medium may include instructions operable to cause a processor to generate a downlink resource grant that indicates resources assigned to a UE in a data region of a TTI, generate an uplink resource grant for the UE and transmit a control message within a control region of the TTI, wherein the control message includes the downlink resource grant at a first position of the control region that is defined relative to a first boundary of the control region and the uplink resource grant at a second position of the control region that is defined relative to a second boundary of the control region.

Another method of wireless communication is described. The method may include generating a control message for a first data region and a second data region of a TTI, wherein the control message includes one or more resource allocation bits to be used by a UE to determine that the first data region and the second data region are allocated to the UE, transmitting the control message in a control region of a first resource element block of the TTI, and transmitting, based at least in part on the one or more resource allocation bits, data in the first data region of the first resource element block of the TTI and data in the second data region of a second resource element block of the TTI.

Another apparatus for wireless communication is described. The apparatus may include means for generating a control message for a first data region and a second data region of a TTI, wherein the control message includes one or more resource allocation bits to be used by a UE to determine that the first data region and the second data region are allocated to the UE, means for transmitting the control message in a control region of a first resource element block of the TTI, and means for transmitting, based at least in part on the one or more resource allocation bits, data in the first data region of the first resource element block of the TTI and data in the second data region of a second resource element block of the TTI.

Another apparatus for wireless communication is described. The apparatus may include a processor, memory in electronic communication with the processor, and instructions stored in the memory. The instructions may be operable to cause the processor to generate a control message for a first data region and a second data region of a TTI, wherein the control message includes one or more resource allocation bits to be used by a UE to determine that the first data region and the second data region are allocated to the UE, transmit the control message in a control region of a first resource element block of the TTI, and transmit, based at least in part on the one or more resource allocation bits, data in the first data region of the first resource element block of the TTI and data in the second data region of a second resource element block of the TTI.

Another non-transitory computer readable medium for wireless communication is described. The non-transitory computer-readable medium may include instructions operable to cause a processor to generate a control message for a first data region and a second data region of a TTI, wherein the control message includes one or more resource allocation bits to be used by a UE to determine that the first data region and the second data region are allocated to the UE, transmit the control message in a control region of a first resource element block of the TTI, and transmit, based at least in part on the one or more resource allocation bits, data in the first data region of the first resource element block of the TTI and data in the second data region of a second resource element block of the TTI.

DETAILED DESCRIPTION

Figure 1:
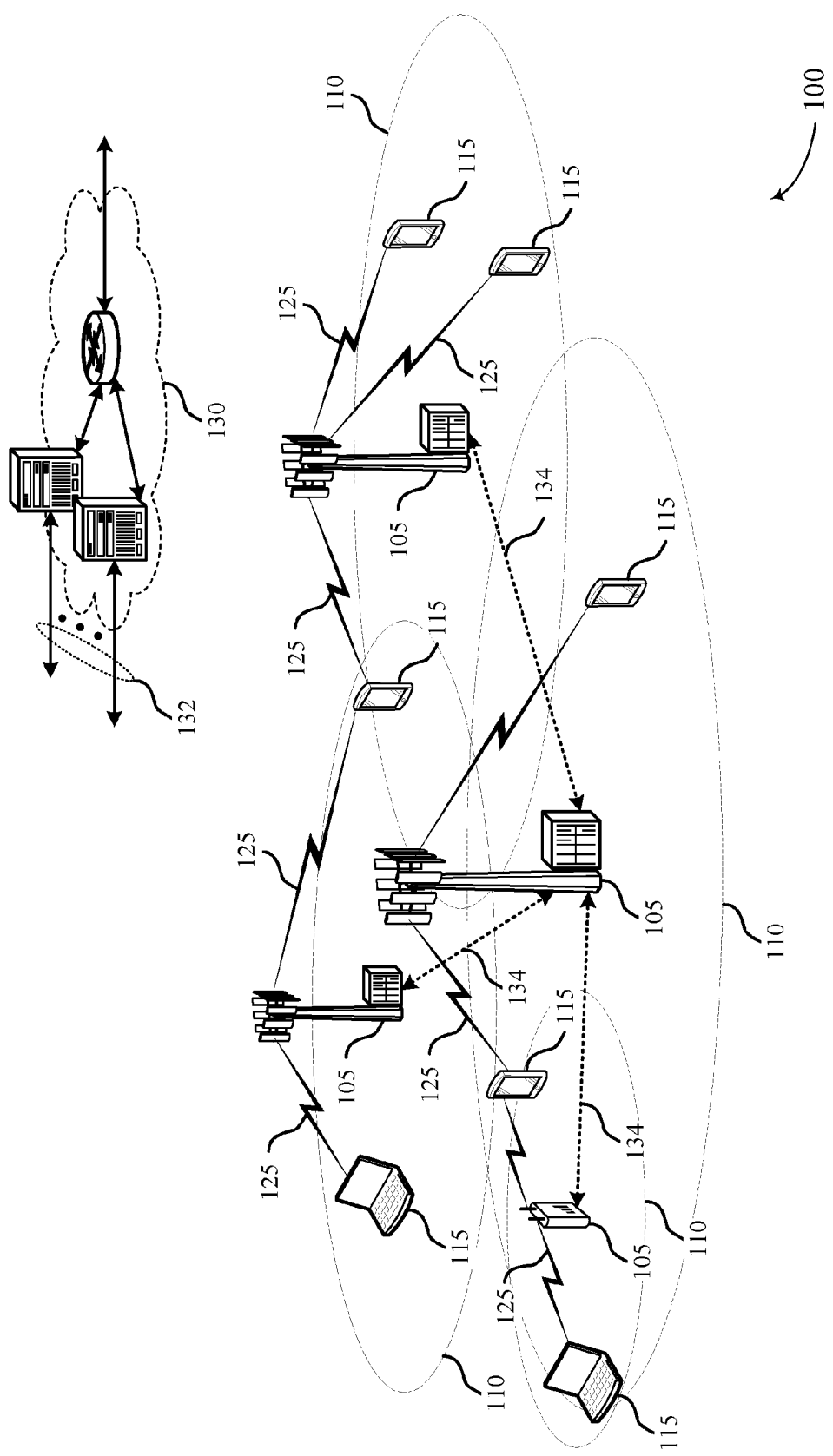
FIG. 1 illustrates an example of a system for wireless communication that supports downlink control channel structures for low latency applications in accordance with aspects of the present disclosure.

Control channels for low latency transmissions may be designed, mapped, and communicated to decrease signaling overhead and to increase the availability of resources for low latency data channels. Data channels using reduced length transmission time intervals (TTIs) (e.g., including a shortened TTI (sTTI)) may encounter a number of challenges including the need to efficiently support multiple low latency users as well as legacy users, while allowing for the efficient reception and decoding of control information. A sTTI may include multiple resource blocks for downlink transmissions of data. Certain resources within the sTTI may have already been allocated for other types of transmission. Such non-low latency transmissions that may be scheduled within the sTTI may include legacy data transmissions in a physical downlink control channel (PDSCH) within a portion of the system bandwidth also used by the low latency users, narrowband internet-of-things (NB-IOT) type transmission, or common signals, such as a cell-specific reference signal (CRS), primary synchronization signal (PSS), secondary synchronization signal (SSS), or physical broadcast channel (PBCH), or other signals reserved by higher level signaling, such as radio resource control (RRC) signaling.

Efficient coexistence between low latency and non-low latency transmissions may increase capacity and transmission efficiency. A control region may be located at the beginning of a resource block, and a user equipment (UE) may receive and decode the control information to determine that the data region of the resource block has been allocated for that UE. Mechanisms to provide for efficient reception and decoding of this control information are desired. In addition, reducing the size of the control region, or otherwise maximizing the size of the data region of the resource block relative to the control region, or even eliminating one or more of the control regions from one or more of the resource blocks of the sTTI to minimize the impact of control overhead are desired.

In one example, a first control message in a control region of a first TTI may provide an indication to identify a data region of the first TTI. A data region of a second TTI may then be identified based on a grant of resources received in a second control message of the second TTI (e.g., a sTTI), where the data region of the first TTI and the control region of the second TTI are frequency division multiplexed with the data region of the second TTI. The data region of the first TTI may be a non-low latency transmission such that a receiving UE may rate match the data region of the section TTI around the data region of the first TTI to receive low latency data. This technique may improve efficiency and support coexistence between low latency and non-low latency transmission with little impact on control overhead.

In another example, a downlink grant may be transmitted at the beginning of a control message in a control region of a sTTI, and uplink grants may be transmitted at the end of the control region. A configuration for the downlink control message that anchors the downlink grant at the beginning of the control region, and anchors the one or more uplink grants, if any, at the end of the downlink control message, may reduce the number of blind decodes that a receiving UE needs to perform, and/or allow for the processing of the downlink grant to begin prior to the UE completing searching for uplink grants. Thus, processing time and latency may be optimized. In addition, in some cases, one or more bits may be added (e.g., to an information field) to a downlink grant to indicate a position within the control region for the start of the uplink grants. This indication may allow for a number of different aggregation levels to be used, while allowing for unused portions of the control region to be reallocated as part of the data region.

In other examples, a sTTI may include a number of resource blocks, each of which may be assigned to a low latency user. In some cases, a downlink grant, which may be included in a control message in a control region at the beginning of a resource block, may be used to indicate the allocation of the data region of that resource block to a particular user. A number of bits corresponding to the number of other resource blocks (e.g., the total number of resource blocks of the sTTI minus one) may be added to the downlink grant to indicate whether the downlink grant may also be subsequent resource blocks in the sTTI. As such, control channel overhead may be reduced by reducing a total number of downlink grants, while minorly changing the total size of each downlink grant.

Aspects of the disclosure introduced above are described below in the context of a wireless communications system. Resource allocation diagrams are then used to illustrate aspects of the disclosure. Aspects of the disclosure are further illustrated by and described with reference to apparatus diagrams, system diagrams, and flowcharts that relate to downlink control channel structure for low latency applications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) (or LTE-Advanced) network.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a base station 105 and a UE 115 may communicate using more than one carrier. Each aggregated carrier is referred to as a component carrier (CC). Each component can have a bandwidth of, e.g., 1.4, 3, 5, 10, 15 or 20 MHz. In some cases, the number of CCs can be limited to, e.g., a maximum of five 20 MHz carriers, giving a maximum aggregated bandwidth of 100 MHz. In frequency division duplexing (FDD), the number of aggregated carriers can be different in downlink (DL) and uplink (UL). The number of UL component carriers may be equal to or lower than the number of DL component carriers. The individual component carriers can also be of different bandwidths. For time division duplexing (TDD), the number of CCs as well as the bandwidths of each CC will normally be the same for DL and UL. Component carriers may be arranged in a number of ways. For example, a carrier aggregation (CA) configuration may be based on contiguous component carriers within the same operating frequency band, i.e., called intra-band contiguous CA. Non-contiguous allocations can also be used, where the component carriers may be either be intra-band, or inter-band.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include CDMA systems, TDMA systems, FDMA systems, and OFDMA systems. A wireless multiple-access communications system may include a number of base stations, each simultaneously supporting communication for one or more multiple communication devices, which may be otherwise known as UEs.

A base station 105 may communicate with one or more of UEs 115 using low latency transmissions, for example using sTTIs. A sTTI may be divided into a number of resource blocks, one or more of which may include a control region. The control region may include a downlink grant for a low latency UE 115, for example indicating a data region of the resource block is for the UE 115 to receive data.

In some examples, a first TTI may include a control region, for example a PDCCH, that includes an indication of a data region within the first TTI. The data region of the first TTI may be for a PDSCH, NB-IOT, or common signaling transmission, such as a PSS, SSS, CRS, or PBCH, transmitted by a base station 105. The first TTI may overlap at least in part with a second TTI. The second TTI may be a shortened TTI (sTTI) made up of one or more resource blocks for low latency transmissions, where the data region within the first TTI punctures or otherwise falls within one or more of the resource blocks of the second TTI. A control region of the second TTI may be a shortened PDCCH (sPDCCH) for reception by a low latency UE 115. The control region may include a control message that has a grant of downlink resources for the UE 115, where the grant indicates a data region of a resource block of the second TTI such that the indicated data region is frequency division multiplexed with the data region of the first TTI. A UE 115 that receives the downlink grant in the sPDCCH may identify the data region of the first TTI, which may be for other UEs 115, and the data region for the low latency UE 115, and rate match around the data region of the first TTI to receive low latency data in the data region of the second TTI.

In other examples, a downlink grant transmitted in the control region of a resource block may be both for the resource block in which the downlink grant is sent by a base station 105 (or received at a UE 115) and for a second resource block within the same TTI. In particular, the downlink grant may include an indication (e.g., a field made up of a number of bits that is one less than the total number of resource blocks in the TTI) to inform the UE 115 that the downlink grant, in addition to being for data to be received by the UE 115 in a data region of the resource block, is also for the UE 115 to receive data in a data region of one or more of the other resource blocks in the TTI.

In addition to a downlink grant in a control region of the TTI, the control region may include one or more uplink grants. In some cases, one or more of the uplink grants may be for the same UE 115, as the downlink grant. In some other cases, one or more of the uplink grants may be for a different set of UEs 115. In some cases, the downlink grant may be at the beginning of the control region, for example, against a first boundary of the control region; and the one or more uplink grants may be at the end of the control region, against a second boundary of the control region. In some cases, the size of the control region may be large enough so that, for the different possible aggregation levels, uplink grants and the downlink grant do not overlap in the control region. An unused portion of the control region, such as for lower aggregation levels, may be reallocated to the data region. In some cases, an indication of the start of the uplink grants may be provided in the downlink grant of the control region so that, in conjunction with knowledge provided by the UE 115 of the end of its downlink grant, the UE 115 may identify the reallocated data region within the control region.

Figure 2:
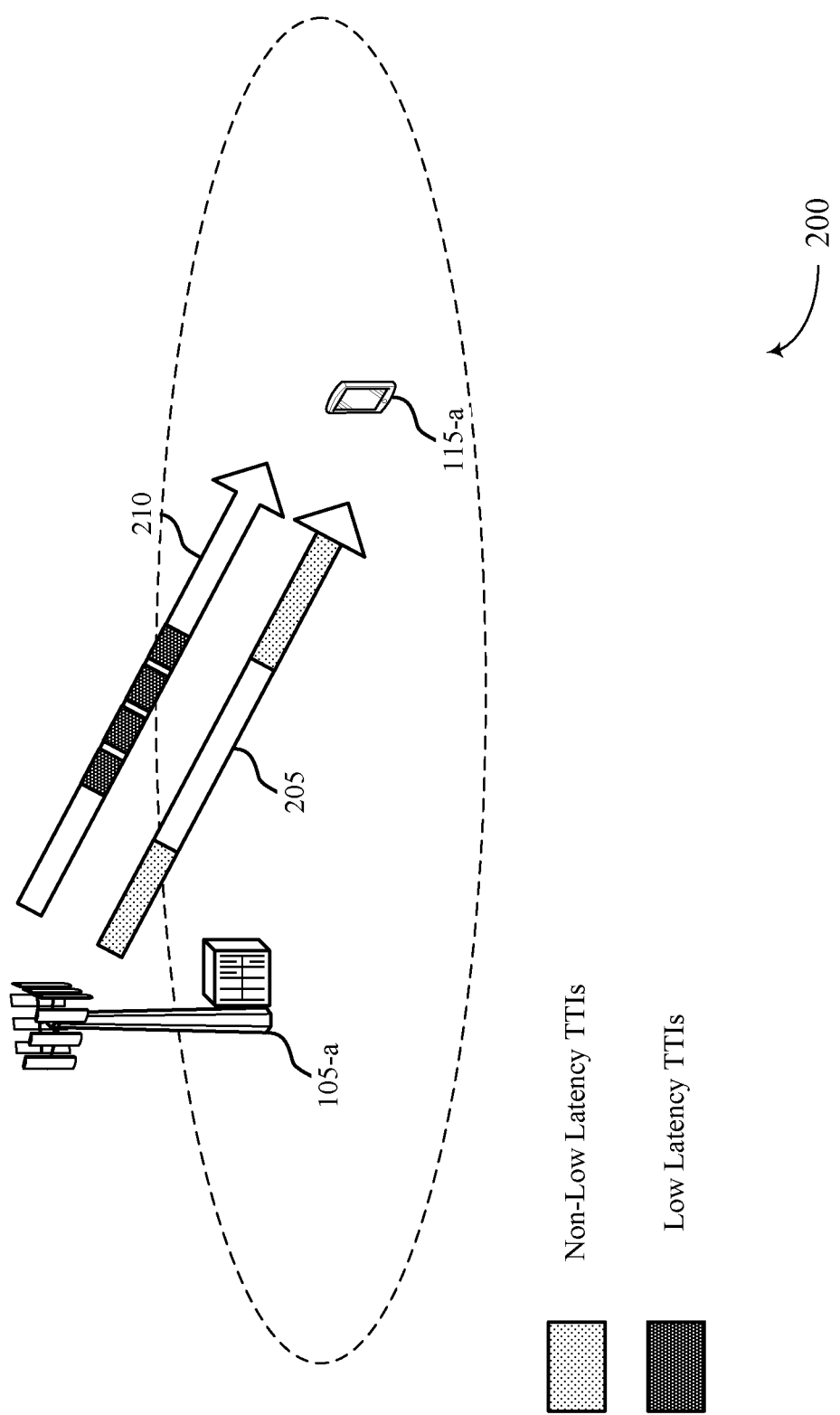
FIG. 2 illustrates an example of a wireless communications system that supports downlink control channel structures for low latency applications in accordance with aspects of the present disclosure.

FIG. 2 illustrates an example of a wireless communications system 200 for downlink control channel structures for low latency applications. Wireless communications system 200 includes base station 105-*a* and UE 115-*a*, which may be examples of aspects of a base station 105 and a UE 115, as described with reference to FIG. 1. Base station 105-*a* may transmit resource allocations and other control information in one or more sPDCCH transmissions to the UE 115-*a*. The resource allocations may include one or both of downlink grants and uplink grants of resources for transmission of downlink data (e.g., in a sPDSCH) and uplink data (e.g., in a sPUSCH) for the UE 115-*a*. Wireless communications system 200 may support non-low latency communication 205 and a low latency communication 210. Resources for the low latency communication 210 may be time division multiplexed and/or frequency division multiplexed with the non-low latency communication 205.

A sTTI for low latency communications may have multiple resource blocks, which may span the whole system bandwidth or a portion of the system bandwidth. The resource blocks may have the same or different sizes in frequency domain. Each resource block may be allocated for a single user or multiple users. The users may access one, multiple, or all of the resource blocks of the sTTI, depending on their configuration. The resource block structure used may be defined by higher level signaling, for example, for a semi-static configuration.

A resource block may have a sPDCCH associated with the resource block. The sPDCCH may be embedded in the resource block. The sPDCCH may be at the beginning of the resource block (e.g., in the first one or more symbols of the resource block) to enable early decoding of the sPDCCH in the resource block. The sPDCCH may span the bandwidth of the resource block, or may occupy less than the full bandwidth of the resource block, with additional signaling included above (e.g., at a higher frequency) and/or below (e.g., at a lower frequency) the resource elements occupied by the sPDCCH in the resource block.

In some cases, a sPDCCH may allocate a sPDSCH to a low latency user for a resource block that has already been allocated to a PDSCH for some other users (e.g., legacy users) in a TTI. The TTI may overlap in whole or in part with at least one sTTI. That is, a PDSCH allocation of a TTI may overlap in whole or in part with a resource block of a sTTI. A transmission with a PDCCH (e.g., which may be referred to as a legacy or regular PDCCH) for a TTI may include an indication of the PDSCH resource allocation within the TTI. For example, a PDSCH indicated by the PDCCH may be allocated to a set of frequency resources. A low latency user may be configured to monitor for such PDCCHs (e.g., receive and decode legacy PDCCHs) in addition to sPDCCHs. The low latency user may thus receive and decode the indication in the PDCCH and identify the PDSCH resource allocation.

In some cases, the low latency user may also receive a sPDCCH identifying a sPDSCH of a resource block of a sTTI for the low latency user. Furthermore, in some cases, the resource block may also include a regular, or legacy PDSCH resource allocation. In some cases, the low latency user, having received the indication for the PDSCH, may determine a location of the PDSCH within the sTTI. Based on the indication, the low latency user may then determine that the sPDSCH associated with the sPDCCH that the low latency user has received, for example based on a downlink grant in the sPDCCH, is frequency division multiplexed with the regular or legacy PDSCH. Thus, the low latency user may receive low latency data in a sPDSCH, even in the presence of a legacy PDSCH resource allocation within the sTTI, by monitoring for and identifying an indicator in the legacy or regular PDCCH.

In other cases, a sPDCCH for one resource block within a sTTI for a user may include a downlink grant for one or more additional resource blocks within the sTTI for the same user. For example, as described above, the sPDCCH may be in the first portion of the sTTI block (e.g., in the first symbol of the sTTI) at a predefined location within the resource block of the sTTI. A low latency user may monitor the control region (e.g., the sPDCCH) for each sTTI resource blocks to determine whether a downlink grant of resources has been sent (e.g., from a serving base station 105-$a$) in the sPDCCH to the low latency user. A low latency user may search for both uplink and downlink grants in the sPDCCH. In some examples, a two stage grant for the low latency user may be used, where the first stage grant, received in messaging sent during a time interval prior to the sTTI, specifies an aggregation level associated with the resource blocks of the sTTI.

As described above, a sPDCCH may be positioned at the beginning of a resource block of a sTTI. In addition, a downlink grant of the sPDCCH may be positioned at the beginning of the sPDCCH. By providing the downlink grant for a low latency user in a same position of each sPDCCH, a search space for the low latency user may be reduced. In some examples, if a low latency user searches for a control message (e.g., for a downlink grant of resources) for that user in a sPDCCH, and successfully identifies the presence of a downlink grant, the low latency user may infer that the associated sPDSCH of that resource block is allocated for that low latency user. Thus, the low latency user may efficiently identify the sPDSCH allocated to itself.

In some cases, the downlink grant may include one or more bits that point to other resource blocks of the sTTI comprising a sPDSCH, for that same low latency user. In some cases, the one or more bits may include resource assignment information. Each of the one or more bits may indicate whether or not a resource block is allocated for the same low latency user. For example, if a sTTI includes three resource blocks, two downlink grant bits in a sPDSCH of one resource block may be used to indicate whether the downlink grant is for any of the other three resource blocks for the low latency user.

In some cases, downlink grants in other resource blocks may be for one or more other low latency users, and may likewise indicate that the sPDSCH in the resource block containing the sPDCCH with the downlink grant is for one or more of the other low latency user, and one or more bits (e.g., two bits for three resource blocks) may be used to indicate whether any of the other resource blocks are for one or more of the other low latency users. The bits may be appropriately indexed and the resource block to which they relate may be based on a position of the resource block in which the one or more bits of the downlink grant appear. The above-described procedure may efficiently indicate downlink grants, at least in part, because a low latency user may only need to perform a blind decode in a fixed position of the sPDCCH within the resource block, and a number of blind decodes used to determine the downlink grant may be limited to a number of resource blocks configured by a base station 105-$a$ in the sTTI.

As described above, a downlink grant may have a position at the beginning of a sPDCCH. In some cases, one or more uplink grants for low latency users may be positioned in a sPDSCH of a sTTI that already contains a downlink grant for a low latency user, where the uplink grant may be for a different low latency user than the low latency user that the downlink grant is for. As described above, a first stage grant may specify an aggregation level. The one or more uplink grants may be sent at the specified aggregation level. Where other aggregation levels are specified, the uplink grants may be sent according to other specified aggregation levels.

The uplink grants of a sPDCCH already containing a downlink grant may be separated from the downlink grants. For example, the downlink grants may be transmitted at the beginning of the sPDCCH control region, and the uplink grants may be sent at the end of the sPDCCH control region. As used herein, the sPDCCH control region may be a virtual control region, for example meaning that the resource elements of the sPDCCH may not all be adjacent in the time-frequency domain. The downlink and uplink grants of a sPDCCH may be separated at least in part so that the downlink and uplink grant search spaces do not overlap. Providing the downlink grant at a fixed position relative to a boundary of the sPDCCH control region, and uplink grants at a fixed position relative to another boundary of the sPDCCH control region may reduce the number of blind decode attempts for a low latency user. In addition, because a downlink grant may be received at a set or predetermined position that is separated from a search space for the one or more uplink grants, UE 115-$a$ may begin to decode the downlink grant prior to completing a blind decoding process for the uplink grants. In some cases, downlink grant processing and uplink grant blind decoding may proceed in parallel, thus increasing efficiency by decreasing the amount of time needed for the UE 115-$a$ to receive and process a sPDCCH.

A position of each of the uplink grants to be transmitted in a sPDCCH may be determined by the base station 105-$a$ based at least in part on the uplink grant aggregation level. As described above, the base station 105-$a$ may transmit an indication of the uplink grant aggregation level to a low latency user in a prior grant message. The base station 105-$a$ may statically define uplink grant locations for each of multiple aggregation levels. In other examples, multiple uplink grant locations may be defined for a particular aggregation level. Multiple uplink grant locations may result in a greater number of blind decoding attempts by the UE 115-$a$, since there are an increased number of potential uplink grant locations for the UE 115-$a$.

In some examples, the size of the sPDCCH control region may be at least large enough to accommodate a nominal level of grants and aggregation levels without overlap of the downlink grants and uplink grants at the various aggregation levels. As such, a portion of the sPDCCH control region may be unused. The size of the unused portion of the sPDCCH control region may depend on a number of uplink grants and the aggregation level for a particular sPDCCH. This unused sPDCCH control region may be repurposed by including an indication in the downlink grant of the sPDCCH (e.g., a sPDCCH rate matching information field) that indicates the start of the uplink grants in the sPDCCH. The UE 115-$a$ that holds the downlink grant may rate match the sPDSCH data region around the downlink grant and uplink grants, if any, to use this otherwise unallocated portion of the sPDCCH as an additional portion of the sPDSCH. The size of this indicator may provide the number of available positions to start the uplink grants in the sPDCCH. For example, where the indictor includes three bits, one of eight possible positions for the start of the uplink grants may be indicated.

Figure 3:
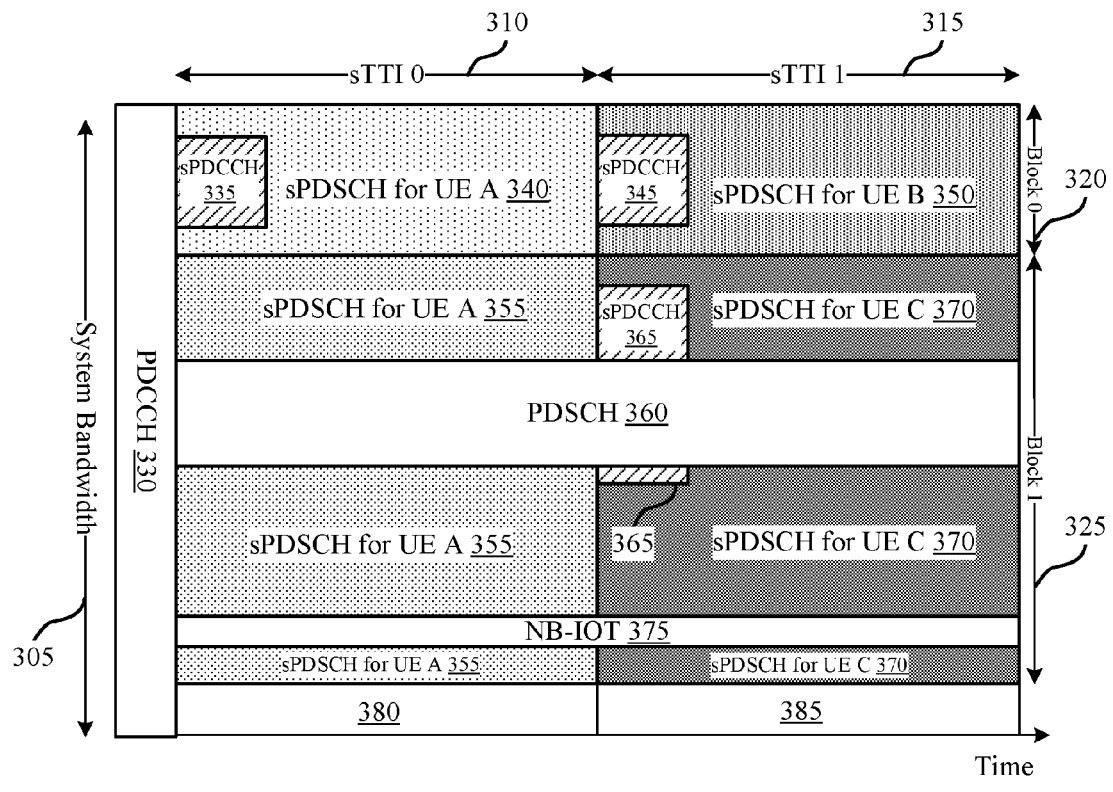
FIGS. 3-5B illustrate examples of resource allocation diagrams that support downlink control channel structures for low latency applications in accordance with aspects of the present disclosure.

FIG. 3 illustrates an example of a resource allocation diagram 300 for downlink control channel structures for low latency applications. Resource allocation diagram 300 shows a system bandwidth 305, and two sTTIs: sTTI 310 and sTTI 315. In some cases, sTTI 310 and sTTI 315 may be examples of low latency communication 210 described with reference to FIG. 2. Each sTTI is associated with two resource blocks, resource block 320 and resource block 325. The resource blocks 320 and 325 need not necessarily span the system bandwidth 305. For example, unallocated region 380 and unallocated region 385 in sTTI 310 and sTTI 315, respectively, may be within the system bandwidth, but not allocated as low latency resource blocks.

In some cases, PDCCH 330, which in some examples may be included at the start of a subframe, may be transmitted by a base station 105 for a TTI associated with the starting subframe. In some other cases, PDCCH 330, which may be a legacy or non-legacy PDCCH may allocate resources within the TTI. In particular, in resource allocation diagram 300, PDCCH 330 may allocate PDSCH 360. In some cases, PDCCH 330 may include a control message receivable by a low latency user, and indicate an allocation of PDSCH 360 within the system bandwidth 305. PDSCH 360 may have a duration of 1 ms in some examples.

Base station 105 may allocate resource block 320 and resource block 325 of sTTI 310 to a low latency user, UE A; resource block 320 of sTTI 315 to a low latency user, UE B; and resource block 325 of sTTI 315 to a low latency user, UE C. The base station 105 may include sPDCCH 335 allocating resources (e.g., by including a first DL grant in the sPDCCH 335) to sPDSCH 340 for UE A in a control region of resource block 320 of sTTI 310. In addition, sPDCCH 335 may allocate resources (e.g., by including a second DL grant in the sPDCCH 335) to sPDSCH 355 for UE A in a control region of resource block 325 of sTTI 310. In this example, base station 105 may frequency division multiplex sPDSCH 355 with PDSCH 360, such that a sPDSCH 355 may include portions both above and below PDSCH 360 in frequency. The base station 105 may provide a control message, for example, an indication in PDCCH 330 that it has allocated PDSCH 360 to UE A. In some cases, the receiving UE A may then monitor for and read the indication in PDCCH 330 that PDSCH 360 has been allocated to UE A. In such cases, after receiving the downlink grant in sPDCCH 335, the UE A may prepare to receive data in the sPDSCH 355 data region on either side of PDSCH 360.

In sTTI 315, sPDCCH 345 may allocate resources for sPDSCH 350 in resource block 320, and sPDCCH 365 may allocate resources for sPDSCH 370 in resource block 325. In this example, base station 105 may frequency division multiplex both sPDCCH 365 and sPDSCH 370 with PDSCH 360, such that sPDSCH 365 includes portions both above and below PDSCH 360 in frequency, and sPDSCH 370 includes portions both above and below PDSCH 360 in frequency. In some cases, receiving UE C may monitor for and, receive the indication in PDCCH 330 that PDSCH 360 has an allocation in sTTI 315. UE C then monitors for and receives the control message of sPDCCH 365 to determine that UE C has an allocated sPDSCH 370 and receives data in the sPDSCH 370 data region on either side of PDSCH 360.

Similarly, a sPDCCH and/or sPDSCH may be frequency division multiplexed around other signals transmitted during sTTI 310 and sTTI 315 as illustrated in resource allocation diagram 300. In one example, a NB-IOT transmission 375 may be reserved to be sent during sTTI 310 and sTTI 315 by RRC signaling. Base station 105 may frequency division multiplex (or rate match) around NB-IOT signaling 375. In other example, one or more resource blocks may be reserved for a common signal, for example a CRS, PSS, SSS, or PBCH, or other signals reserved by higher level signaling, such as RRC signaling.

As described above, the control message in the legacy PDCCH in one TTI may identify a data region such as a PDSCH or NB-IOT, or common signaling, such as PSS, SSS, CRS, or PBCH, that a low latency user (or UE 115) may use to identify a resource allocation in a sTTI containing one or more resource blocks allocated to the low latency user. The low latency user may then receive low latency data, for example in a PDSCH, of a data region of one or more of the resource blocks, where the data is frequency domain multiplexed with the data region identified by the control message in the legacy PDCCH.

Figure 4:
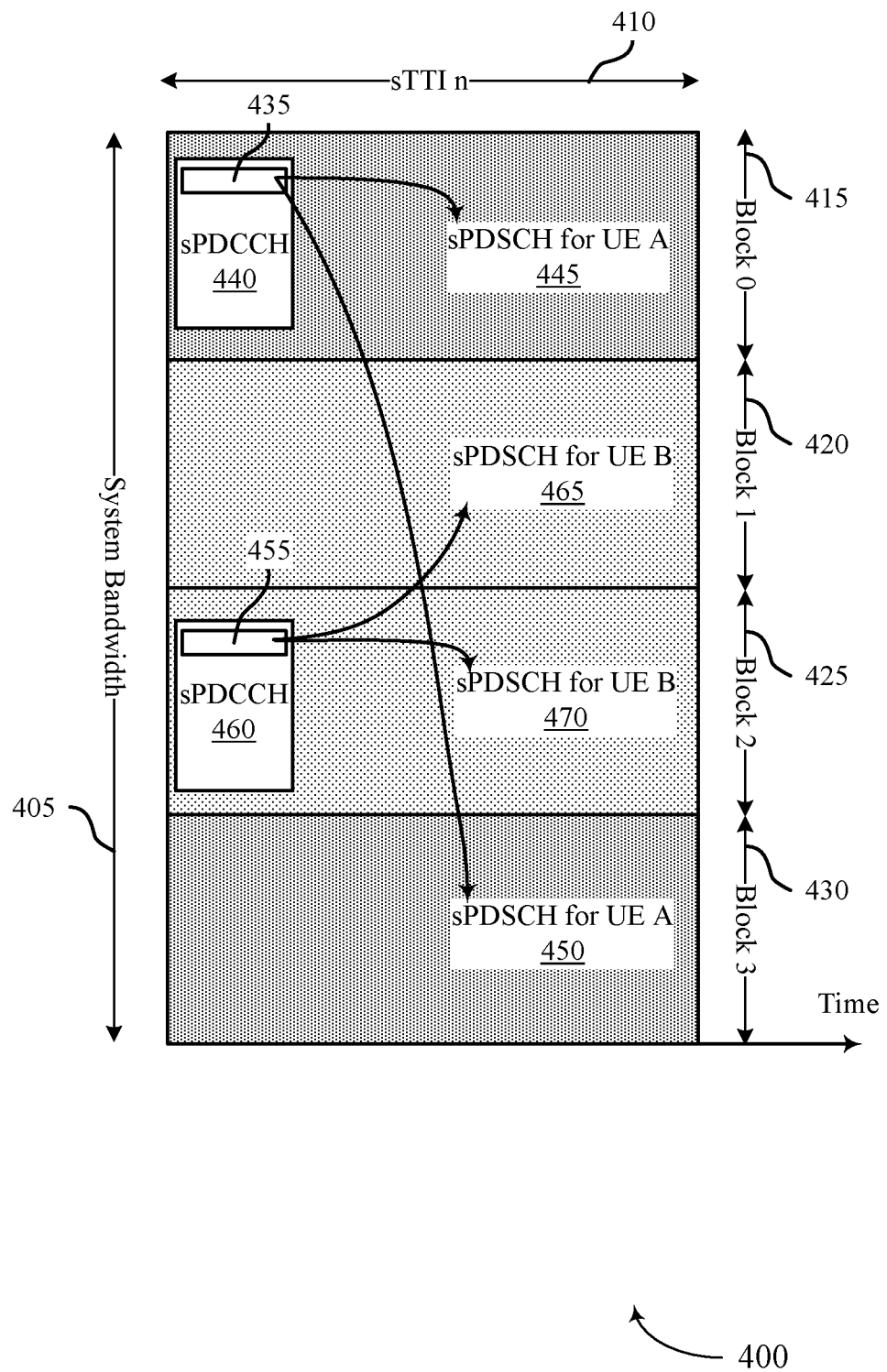

FIG. 4 illustrates an example of a resource allocation diagram 400 for downlink control channel structures for low latency applications. Resource allocation diagram 400 may include sTTI 410 occupying a system bandwidth 405. In some cases, the sTTI 410 may represent a sTTI within a legacy TTI, or a separate TTI. In some examples, and as may be the case with other sTTIs described here, sTTI 410 may be of different durations. For example, in some cases, sTTI 410 may be spread over a single symbol period, or two symbol periods, or a single slot width associated with a legacy TTI, or another time period. In this example, sTTI 410 includes four resource blocks: resource block 415 and resource block 430 for UE A, and resource block 420 and resource block 425 for UE B.

A base station 105 may generate a downlink grant 435 to be included in a sPDCCH 440, the control region of resource block 415. In some cases, a sPDSCH 445 may be in a first symbol period of the resource block 415. In some cases, the downlink grant 435 may be in a data region of the resource block 415. The downlink grant may also be for a second sPDSCH, sPDSCH 450, in a data region of resource block 430 that are also for UE A, to be jointly used to receive data at UE A based on the control information of downlink grant 435.

A base station 105 may also generate a second downlink grant 455 to be included in a sPDCCH 460, the control region of resource block 425. The downlink grant 455 may be for the sPDSCH 470 of the resource block 425, and may also be for the sPDSCH 465 for resource block 420.

For both downlink grants, one or more bits in each of downlink grant 435 and downlink grant 455 may be generated by a base station 105 to indicate other resource blocks of the sTTI that include a sPDSCH for that same low latency user. In this example, sTTI 410 includes four resource blocks. Downlink grant 435 for the UE A may thus include three bits to indicate whether the downlink grant 435 is for any of the other three resource blocks for the UE A.

In one example, the bits of the indication may make up or be a part of a resource allocation field in the downlink grant 435. In other examples, the bits of the indication may be included at another position in a sPDCCH, such as sPDCCH 440, or elsewhere within the control region of a resource block, such as resource block 415. The first bit of the indication may be associated with resource block 420, the second bit may be associated with resource block 425, and the third bit may be associated with resource block 430. The receiving UEs, UE A and UE B may infer the relationship between the bits and the resource blocks. For example, the first bit may be associated with the first resource block of the sTTI 410 that does not contain the downlink grant having the bits of the indication, and so on. In the example shown in resource allocation diagram 400 with respect to sTTI 410, in downlink grant 435, the third bit of the indication may identify the fourth resource block 430 as for UE A. In downlink grant 455, the second bit of the indication may identify the second resource block 420 as for UE B.

The above-described procedure may efficiently indicate downlink grants at least in part because a low latency user may only need to perform a blind decode in a fixed position of the sPDCCH within the resource block, and a number of blind decodes used to determine the downlink grant may be limited to a number of resource blocks configured by a base station (e.g., cell) in the sTTI. Furthermore, the maximum number of bits in the indication of the downlink grant may also be limited to the number of resource blocks of the sTTI minus one.

Figure 5A:
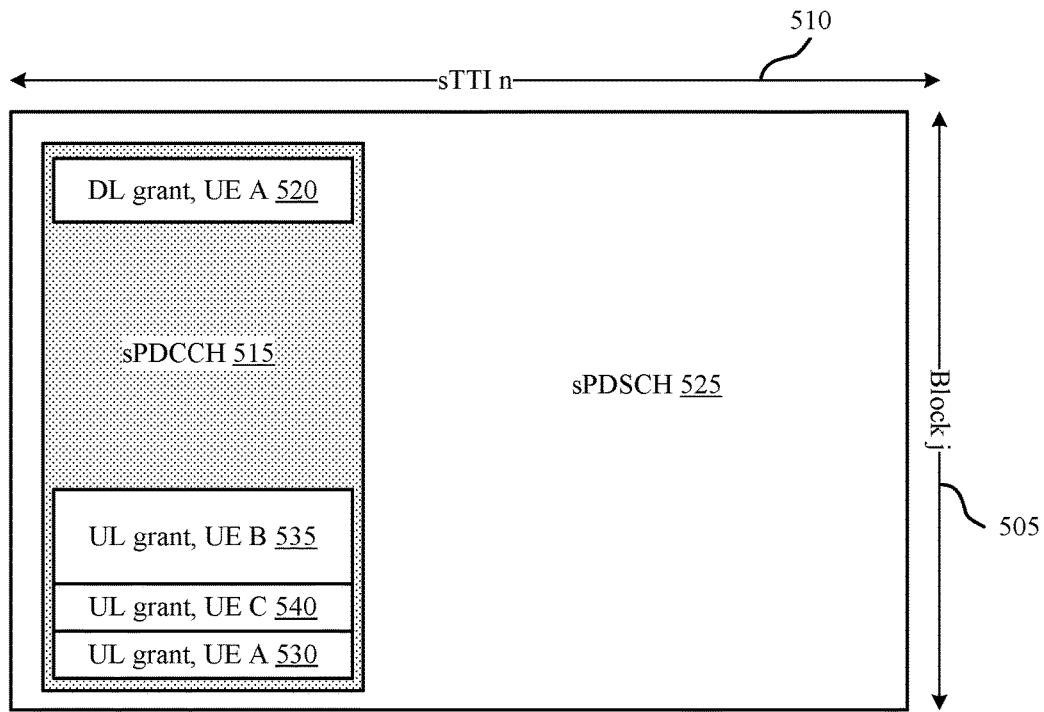
Figure 5B:
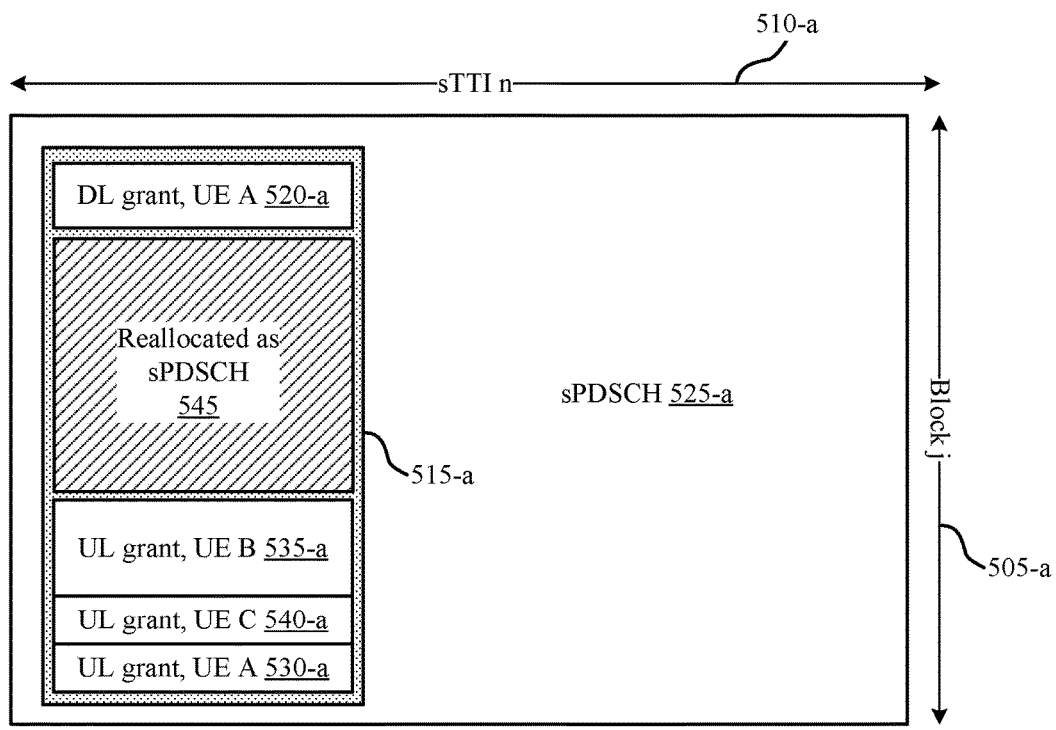

FIGS. 5A and 5B illustrate examples of resource allocation diagrams 501 and 502 for downlink control channel structures for low latency applications.

Each of resource allocation diagrams 501 and 502 show a resource block 505 and 505-a for a sTTI 510 and 510-a, respectively, where the resource block 505 includes a control region including sPDCCH 515 and a data region including sPDCCH 525 for UE A that is indicated by sPDCCH 515. In some cases, sPDCCH 515 may comprise or include one or more aspects of sPDCCH 335, sPDCCH 345, sPDCCH 365, sPDCCH 440, and sPDCCH 460. Furthermore, in some cases, sPDCCH 515 may include at least one downlink grant 520 for the UE A. Some examples of a sPDCCH 515 may include one more uplink grants for one or more UEs, which may also include an uplink grant for the UE A. In some examples, resource allocation diagrams 501 and 502 may include uplink grant 530 for UE A, or uplink grant 535 for UE B, or uplink grant 540 for UE C, or a combination thereof.

As illustrated in resource allocation diagrams 501 and 502, a downlink grant 520 may be at the beginning of the sPDCCH 515, for example, at a position at a first boundary of the sPDCCH 515 control region. In some cases, the uplink grants may be clustered at the end of the control region, sPDCCH 515. The uplink grants may be transmitted by a base station 105 in sPDCCH 515 of resource block 505 according to one of multiple different aggregation levels for UE A. In some examples, the aggregation level for UE A may have been indicated in a previously transmitted grant from base station 105. For example, a two-stage grant configuration may be used, such that the first grant in a previous transmission (e.g., a previous sTTI or TTI, such as a PDCCH in a previously-received TTI) may include the aggregation level for UE A, and the second grant may be the downlink grant 520. The uplink grant 530, uplink grant 535, and uplink grant 540 may be at the end of sPDCCH 515, with the uplink grant 530 for UE A at the end of sPDCCH 515 and located at a position at a second boundary of the sPDCCH 515 control region. In some cases, as depicted, uplink grant 535 and uplink grant 540 may be at positions adjacent to the uplink grant 530 for the UE A. In some cases, the span of sPDCCH 515 may be wide enough such that for any aggregation level that can be indicated for the UE A, the downlink grant 520 and multiple uplink grants may not overlap if the downlink grant 520 is at the beginning of sPDCCH 515 and the uplink grant(s)s are positioned at the end of sPDCCH 515.

The configuration of downlink grants at the beginning of sPDCCH 515 and uplink grants at the end of sPDCCH 515, may reduce the number of blind decoding attempts for a particular UE. For example, one downlink grant for the particular UE may be at the beginning of sPDCCH 515. If an attempted blind decode at the beginning of sPDCCH is unsuccessful, the UE may deduce that the sPDSCH 525 is not for that particular UE.

As illustrated in resource allocation diagram 502, a portion of the control region for sPDCCH 515 may be reallocated to be a part of data region for sPDSCH 525-a, thus recapturing unused control overhead from sPDCCH 515. Thus, reallocated sPDSCH 545 may be relocated from a portion of the sPDCCH 515-a between downlink grant 520-a and the uplink grants, specifically an uplink grant 535-a for UE B. The size of reallocated sPDSCH 545 may depend in part on the aggregation level. The resources of sPDCCH 515-a that are to be used for reallocated sPDSCH 545 may be signaled in the downlink grant 520-a. In particular, an indication may identify the start of the uplink grant region, which may include uplink grant 530-a, uplink grant 535-a, and uplink grant 540-a for sPDCCH 515-a. In some examples, the indication may be rate matching information field, as further described below.

Figure 6:
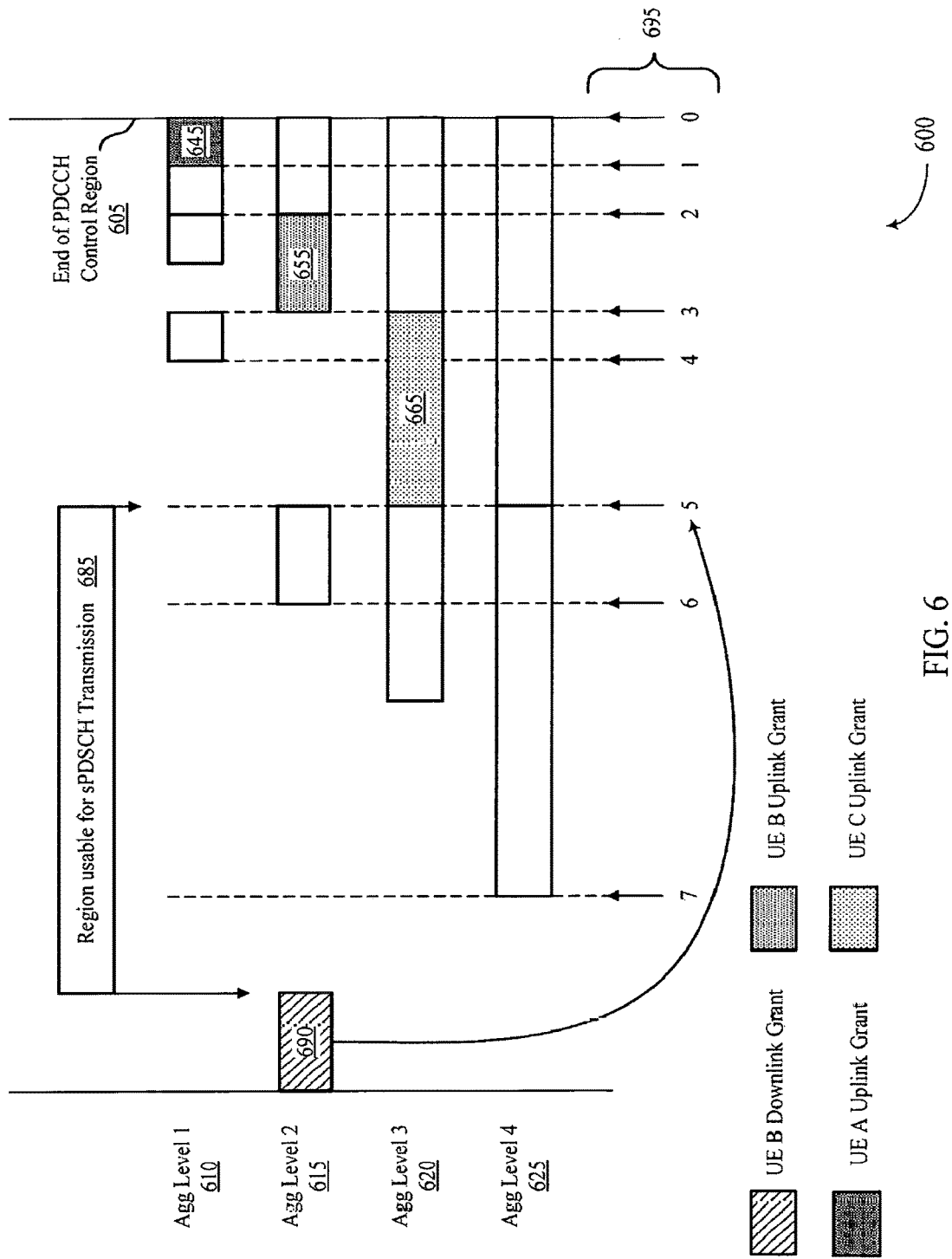
FIG. 6 illustrates an example of an uplink search space that supports downlink control channel structures for low latency applications in accordance with aspects of the present disclosure.

FIG. 6 illustrates an example of an uplink search space 600 for downlink control channel structures for low latency applications. In some cases, uplink search space 600 may represent an uplink search space for a sPDCCH that may be or include one or more aspects of sPDCCH 335, sPDCCH 345, sPDCCH 365, sPDCCH 440, sPDCCH 460, and sPDCCH 515. The uplink search space 600 is shown for four aggregation levels, including a first aggregation level 610, a second aggregation level 615, a third aggregation level 620, and a fourth aggregation level 625. As described above, the uplink grants may be positioned at a the end of a sPDCCH control region, as indicated by boundary 605. An uplink grant for a UE A may be transmitted at the first aggregation level 610, an uplink grant for UE B may be transmitted at the second aggregation level 615, and an uplink grant for UE C may be transmitted at the third aggregation level 620.

As described above, a base station 105 may provide an indication to one or more UEs 115, identifying the start of the uplink grant region, which may include uplink grant 645 for UE A, uplink grant 655 for UE B, and uplink grant 665 for UE C. The indication may be a rate matching information field in a downlink grant, for example downlink grant 690 for the UE B transmitted. at the second aggregation level 615. As illustrated for uplink search space 600, the indication may be at least three bits in length to identify one of eight different positions 695. In this example, downlink grant 690 for the UE B is transmitted at the second aggregation level 615 and includes an indication of '5' to indicate that the start of the uplink grant region is at the fifth position of positions 695. Furthermore, UE B having received its downlink grant 690 may then deduce that a region 685 of the PDCCH control region may be suitable or usable for sPDSCH transmissions. In some cases, as shown, region 685 may exist between the end of the downlink grant 690 for UE B and the fifth position of positions 695.

In other implementations, a greater or fewer number of positions for the start of the uplink grants may be indicated in the downlink grant. A greater number of positions 695 may be indicated by adding one or more bits, for example by increasing the size of the rate matching information field to four or more bits. Increasing the number of positions 695 may increase scheduling flexibility, but may also increase the number of blind decode attempts for a UE receiver to search for uplink grants, thus increasing the overhead. Similarly, a smaller number of positions 695 may be indicated (e.g., four positions using two bits in the downlink grant), decreasing flexibility, but also decreasing overhead and the number of blind decode attempts for a UE receiver.

Figure 7:
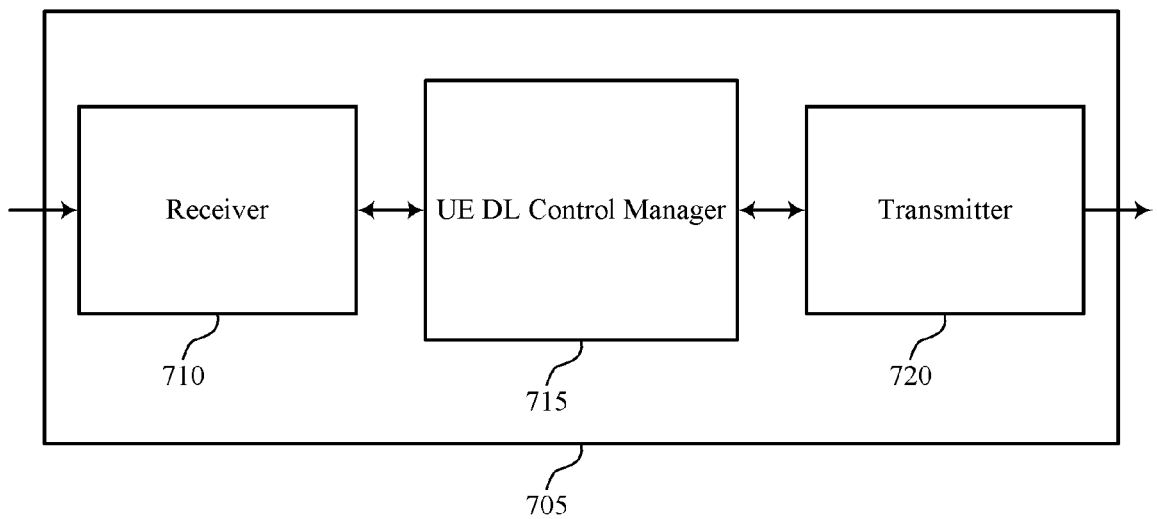
FIGS. 7 through 9 show block diagrams of a device that supports downlink control channel structures for low latency applications in accordance with aspects of the present disclosure.

FIG. 7 shows a block diagram 700 of a wireless device 705 that supports downlink control channel structures for low latency applications in accordance with various aspects of the present disclosure. Wireless device 705 may be an example of aspects of a UE 115 as described with reference to FIGS. 1 and 2. Wireless device 705 may include receiver 710, UE DL control manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to downlink control channel structure for low latency applications, etc.). Information may be passed on to other components of the device. The receiver 710 may be an example of aspects of the transceiver 1035 described with reference to FIG. 10.

UE DL control manager 715 may be an example of aspects of the UE DL control manager 1015 described with reference to FIG. 10.

UE DL control manager 715 may receive a first control message within a control region of a first TTI that has a first duration, identify a data region of the first TTI based on an indication received in the first control message, receive a second control message within a control region of a second TTI that has a second duration that is less than the first duration, where the first TTI and the second TTI at least partially overlap in time, and receive data in a data region of the second TTI based on a grant of resources received in the second control message, where the data region of the first TTI is frequency division multiplexed with the data region of the second TTI, and where the control region of the second TTI is frequency division multiplexed with the data region of the second TTI.

In some cases, the UE DL control manager 715 may also receive a control message within a control region of a TTI, identify a downlink resource grant for the UE at a first position of the control region that is defined relative to a first boundary of the control region, the downlink resource grant indicating resources assigned to the UE in a data region of the TTI, and monitor for an uplink resource grant for the UE at a second position of the control region that is defined relative to a second boundary of the control region.

Furthermore, in some other cases, the UE DL control manager 715 may also receive a control message within a control region of a first resource element block of a TTI, where the control message includes one or more resource allocation bits, receive data in a first data region of the first resource element block based on the one or more resource allocation bits, determine that a second data region of a second resource element block of the TTI is allocated to the UE based on the one or more resource allocation bits, and receive data in the second data region based on the determination.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
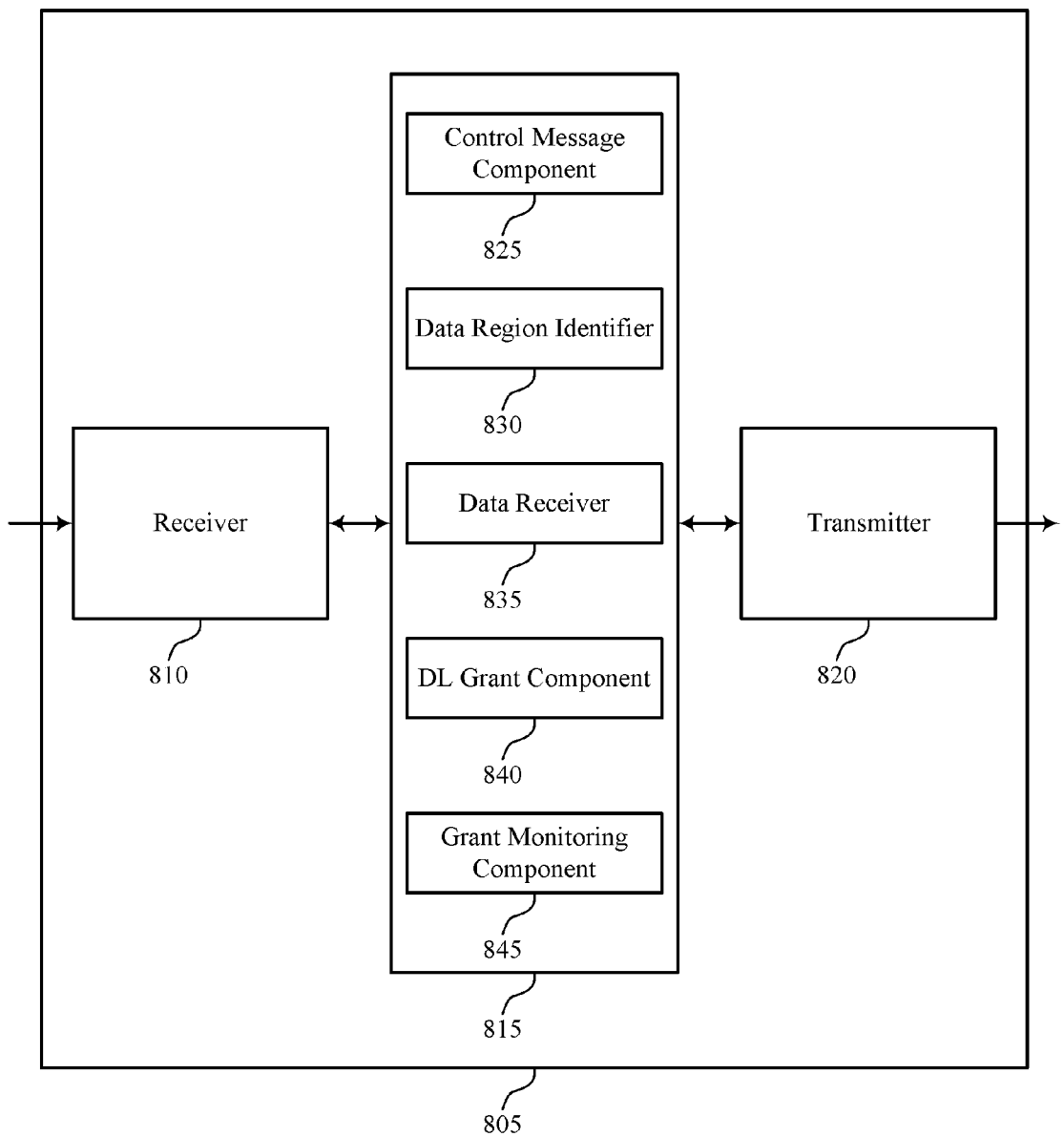

FIG. 8 shows a block diagram 800 of a wireless device 805 that supports downlink control channel structures for low latency applications in accordance with various aspects of the present disclosure. Wireless device 805 may be an example of aspects of a wireless device 705 or a UE 115 as described with reference to FIGS. 1 and 7. Wireless device 805 may include receiver 810, UE DL control manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to downlink control channel structure for low latency applications, etc.). Information may be passed on to other components of the device. The receiver 810 may be an example of aspects of the transceiver 1035 described with reference to FIG. 10.

UE DL control manager 815 may be an example of aspects of the UE DL control manager 1015 described with reference to FIG. 10. UE DL control manager 815 may also include control message component 825, data region identifier 830, data receiver 835, DL grant component 840, and grant monitoring component 845.

Control message component 825 may receive a first control message within a control region of a first TTI that has a first duration, receive a second control message within a control region of a second TTI that has a second duration that is less than the first duration, where the first TTI and the second TTI at least partially overlap in time, receive a control message within a control region of a TTI, receive a control message within a control region of a first resource element block of a TTI, where the control message includes one or more resource allocation bits, identify a position of the second resource element block within the TTI based on the one or more resource allocation bits, and monitor for the control message with one or more data regions of the TTI, where the control message is received based on determining that the control message passes a cyclic redundancy check.

In some cases, the control region of the second TTI includes a shortened physical downlink control channel (physical downlink control channel (PDCCH)). In some cases, the data region of the first TTI includes a PDSCH or a NB-IOT region. In some cases, a duration of the second TTI includes an integer number of symbol periods or one slot.

Data region identifier 830 may identify a data region of the first TTI based on an indication received in the first control message, identify a portion of the data region of the TTI between the first position and the second position of the control region, and determine that a second data region of a second resource element block of the TTI is allocated to the UE based on the one or more resource allocation bits.

Data receiver 835 may receive data in a data region of the second TTI based on a grant of resources received in the second control message, where the data region of the first TTI is frequency division multiplexed with the data region of the second TTI, and where the control region of the second TTI is frequency division multiplexed with the data region of the second TTI, receive data in a first data region of the first resource element block based on the one or more resource allocation bits, and receive data in the second data region based on the determination. In some cases, a location of the control region of the second TTI is indicated in the first control message. In some cases, the data region of the second TTI includes a sPDSCH.

DL grant component 840 may identify a downlink resource grant for the UE at a first position of the control region that is defined relative to a first boundary of the control region, the downlink resource grant indicating resources assigned to the UE in a data region of the TTI and, receive in the downlink resource grant an uplink grant position indicator that indicates the second position of the control region. In some cases, the downlink resource grant includes an information field that includes the uplink grant position indicator. In some cases, the first boundary includes a logical starting point of the control region relative to the TTI.

Grant monitoring component 845 may monitor for an uplink resource grant for the UE at a second position of the control region that is defined relative to a second boundary of the control region and monitor for the uplink resource grant within the control region based on the aggregation level. In some cases, monitoring for the uplink resource grant for the UE includes: monitoring for the uplink resource grant for the UE at one or more additional positions defined relative to the second boundary of the control region or the second position. In some cases, the second boundary includes a logical end point of the control region relative to the TTI.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
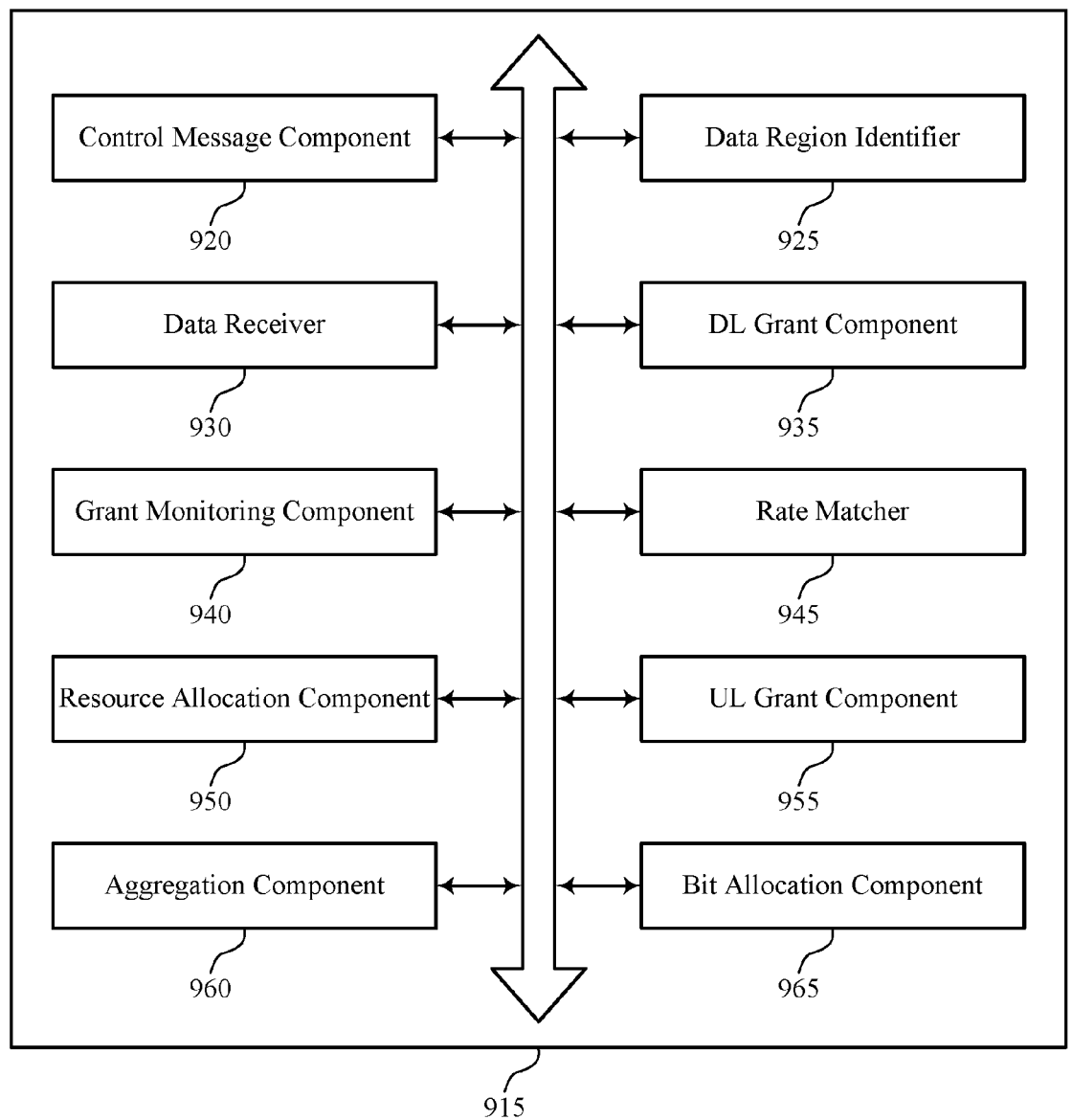

FIG. 9 shows a block diagram 900 of a UE DL control manager 915 that supports downlink control channel structures for low latency applications in accordance with various aspects of the present disclosure. The UE DL control manager 915 may be an example of aspects of a UE DL control manager 715, a UE DL control manager 815, or a UE DL control manager 1015 described with reference to FIGS. 7, 8, and 10. The UE DL control manager 915 may include control message component 920, data region identifier 925, data receiver 930, DL grant component 935, grant monitoring component 940, rate matcher 945, resource allocation component 950, UL grant component 955, aggregation component 960, and bit allocation component 965. Each of these modules may communicate, directly or indirectly, with one another (e.g., via one or more buses).

In some cases, control message component 920 may receive a first control message within a control region of a first TTI that has a first duration, and receive a second control message within a control region of a second TTI that has a second duration that is less than the first duration. In some cases, the first TTI and the second TTI may partially overlap in time. Furthermore, in some cases, control message component 920 may receive a control message within a control region of a TTI (e.g., a first resource element block of a TTI), wherein the control message includes one or more resource allocation bits, identify a position of the second resource element block within the TTI based on the one or more resource allocation bits, and monitor for the control message with one or more data regions of the TTI, where the control message is received based on determining that the control message passes a cyclic redundancy check.

In some cases, the control region of the second TTI includes a sPDCCH. In some cases, the data region of the first TTI includes a PDSCH or a NB-IOT region. In some cases, a duration of the second TTI includes an integer number of symbol periods or one or more slots.

Data region identifier 925 may identify a data region of the first TTI based on an indication received in the first control message, identify a portion of the data region of the TTI between the first position and the second position of the control region, and determine that a second data region of a second resource element block of the TTI is allocated to the UE based on the one or more resource allocation bits.

Data receiver 930 may receive data in a data region of the second TTI based on a grant of resources received in the second control message, where the data region of the first TTI is frequency division multiplexed with the data region of the second TTI, and where the control region of the second TTI is frequency division multiplexed with the data region of the second TTI. Furthermore, in some cases, data receiver 930 may receive data in a first data region of the first resource element block based on the one or more resource allocation bits, and receive data in the second data region based on the determination. In some cases, a location of the control region of the second TTI is indicated in the first control message. In some cases, the data region of the second TTI includes a sPDSCH.

DL grant component 935 may identify a downlink resource grant for the UE at a first position of the control region that is defined relative to a first boundary of the control region, the downlink resource grant indicating resources assigned to the UE in a data region of the TTI and, receive in the downlink resource grant an uplink grant position indicator that indicates the second position of the control region. In some cases, the downlink resource grant includes an information field that includes the uplink grant position indicator. In some cases, the first boundary includes a logical starting point of the control region relative to the TTI.

Grant monitoring component 940 may monitor for an uplink resource grant for the UE at a second position of the control region that is defined relative to a second boundary of the control region and monitor for the uplink resource grant within the control region based on the aggregation level. In some cases, monitoring for the uplink resource grant for the UE includes: monitoring for the uplink resource grant for the UE at one or more additional positions defined relative to the second boundary of the control region or the second position. In some cases, the second boundary includes a logical end point of the control region relative to the TTI.

Rate matcher 945 may be responsible for data region rate matching. In some cases, receiving the data in the data region of the second TTI includes: rate matching around the data region of the first TTI. In some cases, receiving the second control message within the control region of the second TTI includes: rate matching around the data region of the first TTI.

Resource allocation component 950 may identify an additional resource allocation that at least partially overlaps in time with the second TTI and is frequency division multiplexed with the data region of the first TTI and the data region of the second TTI.

UL grant component 955 may identify the second position of the control region based on the uplink grant position indicator.

Aggregation component 960 may determine an aggregation level associated with the control region.

Bit allocation component 965 may identify a number of bits associated with the one or more resource allocation bits and determine a number of resource element blocks of the TTI based on the identified number of bits.

Figure 10:
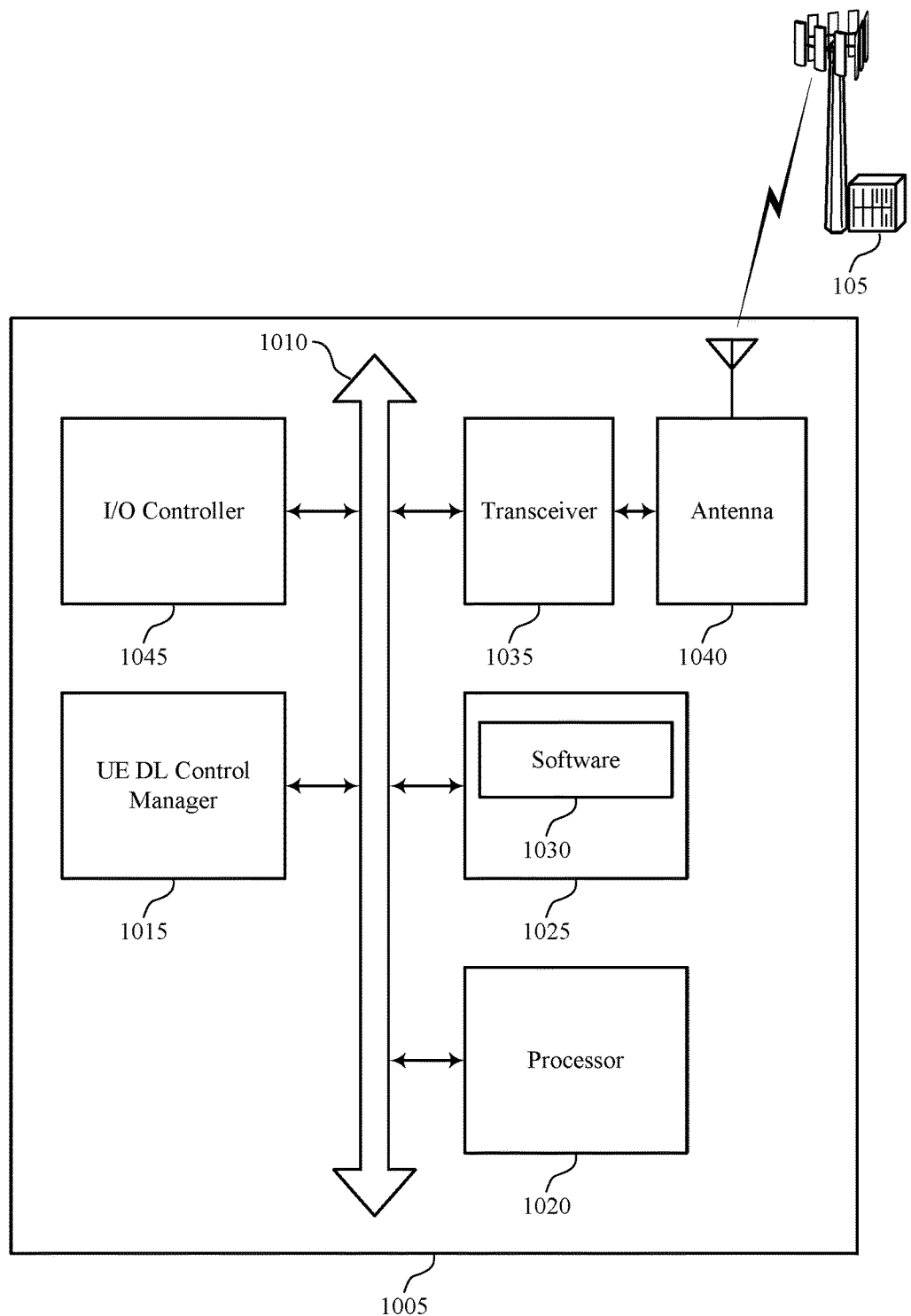
FIG. 10 illustrates a block diagram of a system including a UE that supports downlink control channel structures for low latency applications in accordance with aspects of the present disclosure.

FIG. 10 shows a diagram of a system 1000 including a device 1005 that supports downlink control channel structures for low latency applications in accordance with various aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including UE DL control manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting downlink control channel structure for low latency applications).1020.

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support downlink control channel structure for low latency applications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
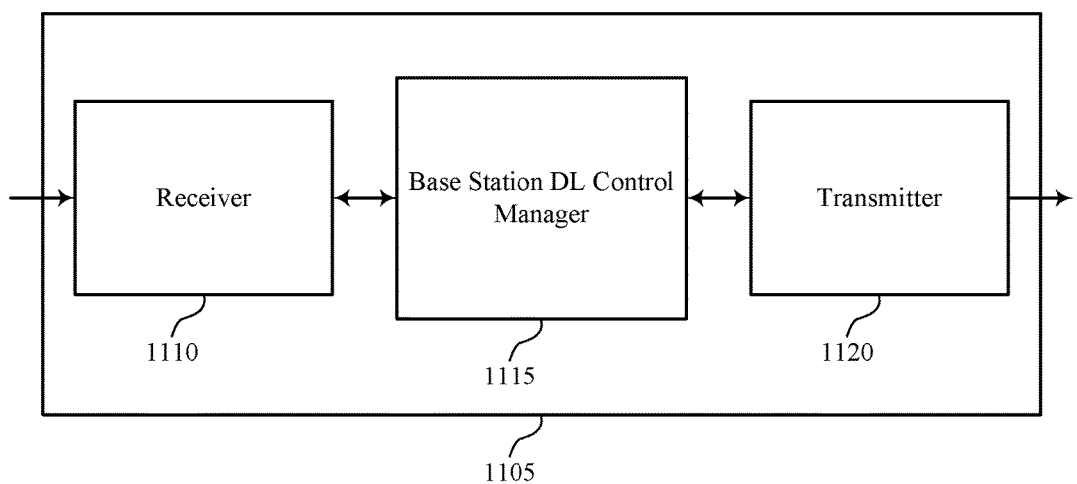
FIGS. 11 through 13 show block diagrams of a device that supports downlink control channel structures for low latency applications in accordance with aspects of the present disclosure.

FIG. 11 shows a block diagram 1100 of a wireless device 1105 that supports downlink control channel structures for low latency applications in accordance with various aspects of the present disclosure. Wireless device 1105 may be an example of aspects of a base station 105 as described with reference to FIG. 1. Wireless device 1105 may include receiver 1110, base station DL control manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to downlink control channel structure for low latency applications, etc.). Information may be passed on to other components of the device. The receiver 1110 may be an example of aspects of the transceiver 1435 described with reference to FIG. 14.

Base station DL control manager 1115 may be an example of aspects of the base station DL control manager 1415 described with reference to FIG. 14.

Base station DL control manager 1115 may transmit a first control message within a control region of a first TTI that has a first duration, where the control region of the first TTI includes an indication to be used by a UE to identify a data region within the first TTI, and transmit data in a data region of a second TTI that has a second duration that is less than the first duration, where the first TTI and the second TTI at least partially overlap in time. In some cases, the data region of the first TTI is frequency division multiplexed with the data region of the second TTI, and the control region of the second TTI is frequency division multiplexed with the data region of the second TTI. In some cases, base station DL control manager 1115 may transmit a second control message within a control region of the second TTI, where the second control message includes a grant of resources for the transmitted data in the data region of the second TTI, and where a location of the control region of the second TTI is indicated in the first control message.

In some cases, the base station DL control manager 1115 may also generate a downlink resource grant that indicates resources assigned to a UE in a data region of a TTI and generate an uplink resource grant for the UE and transmit a control message within a control region of the TTI, where the control message includes the downlink resource grant at a first position of the control region that is defined relative to a first boundary of the control region and the uplink resource grant at a second position of the control region that is defined relative to a second boundary of the control region. The base station DL control manager 1115 may also generate a control message for a first data region and a second data region of a TTI, where the control message includes one or more resource allocation bits to be used by a UE to determine that the first data region and the second data region are allocated to the UE, transmit the control message in a control region of a first resource element block of the TTI, and transmit, based on the one or more resource allocation bits, data in the first data region of the first resource element block of the TTI and data in the second data region of a second resource element block of the TTI.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
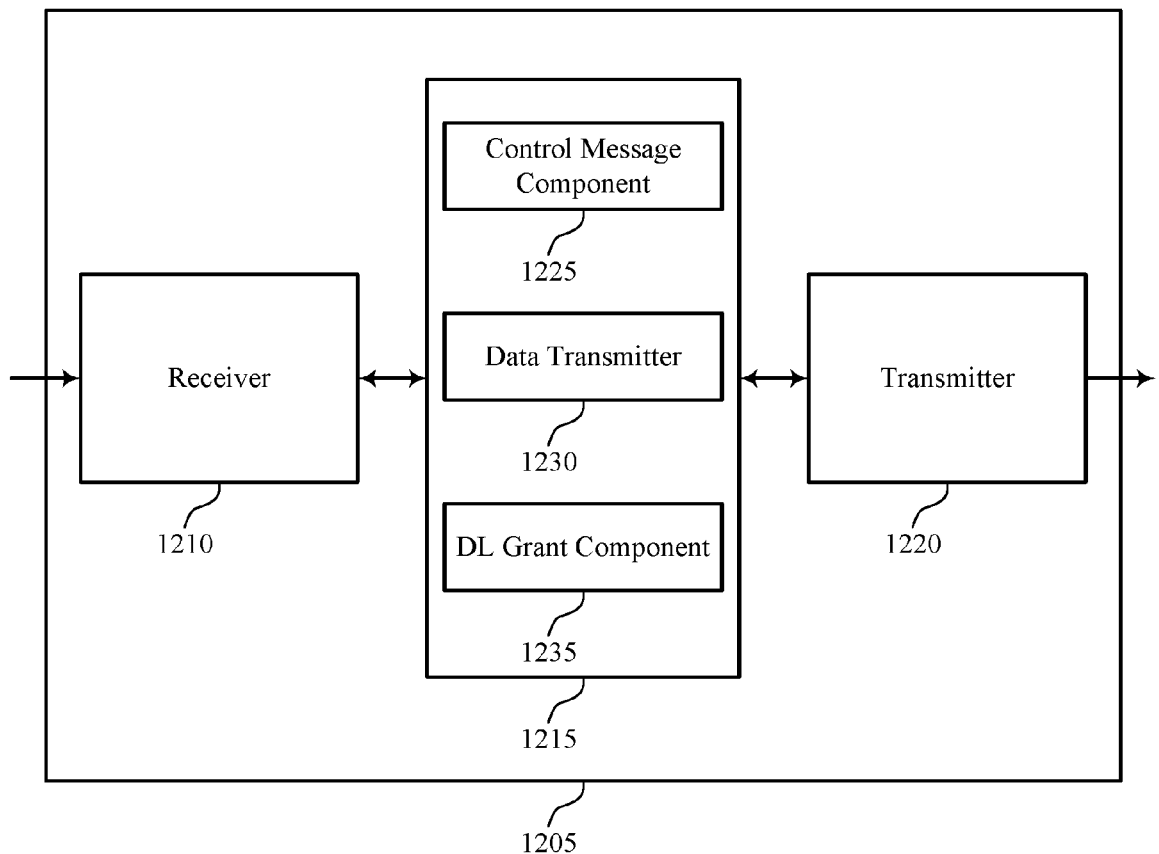

FIG. 12 shows a block diagram 1200 of a wireless device 1205 that supports downlink control channel structures for low latency applications in accordance with various aspects of the present disclosure. Wireless device 1205 may be an example of aspects of a wireless device 1105 or a base station 105 as described with reference to FIGS. 1, 2 and 11. Wireless device 1205 may include receiver 1210, base station DL control manager 1215, and transmitter 1220.

Wireless device 1205 may also include a processor. Each of these components may be in communication with one another (e.g., via one or more buses).

Receiver 1210 may receive information such as packets, user data, or control information associated with various information channels (e.g., control channels, data channels, and information related to downlink control channel structure for low latency applications, etc.). Information may be passed on to other components of the device. The receiver 1210 may be an example of aspects of the transceiver 1435 described with reference to FIG. 14.

Base station DL control manager 1215 may be an example of aspects of the base station DL control manager 1415 described with reference to FIG. 14.

Base station DL control manager 1215 may also include control message component 1225, data transmitter 1230, and DL grant component 1235.

Control message component 1225 may transmit a first control message within a control region of a first TTI that has a first duration, where the control region of the first TTI includes an indication to be used by a UE to identify a data region within the first TTI, transmit a second control message within a control region of the second TTI, where the second control message includes a grant of resources for the transmitted data in the data region of the second TTI, and where a location of the control region of the second TTI is indicated in the first control message.

In some other cases, control message component 1225 may transmit a control message within a control region of the TTI, where the control message includes the downlink resource grant at a first position of the control region that is defined relative to a first boundary of the control region and the uplink resource grant at a second position of the control region that is defined relative to a second boundary of the control region.

Furthermore, in some cases, control message component 1225 may generate a control message for a first data region and a second data region of a TTI, where the control message includes one or more resource allocation bits to be used by a UE to determine that the first data region and the second data region are allocated to the UE, and transmit the control message in a control region of a first resource element block of the TTI.

Data transmitter 1230 may transmit data in a data region of a second TTI that has a second duration that is less than the first duration, where the first TTI and the second TTI at least partially overlap in time, where the data region of the first TTI is frequency division multiplexed with the data region of the second TTI, and where the control region of the second TTI is frequency division multiplexed with the data region of the second TTI and transmit, based on the one or more resource allocation bits, data in the first data region of the first resource element block of the TTI and data in the second data region of a second resource element block of the TTI.

DL grant component 1235 may generate a downlink resource grant that indicates resources assigned to a UE in a data region of a TTI and generate an uplink resource grant for the UE.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
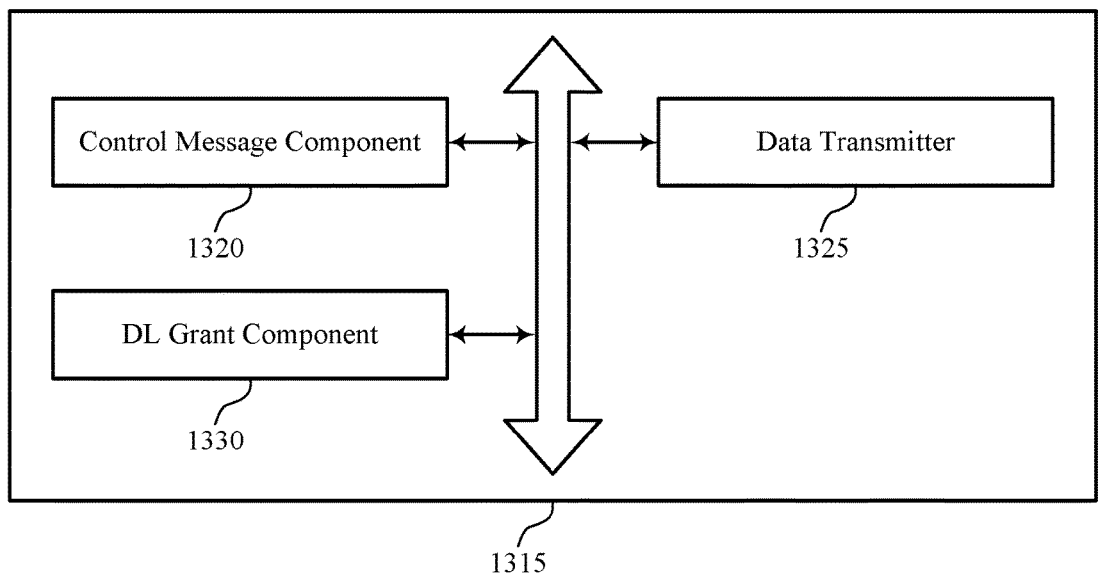

FIG. 13 shows a block diagram 1300 of a base station DL control manager 1315 that supports downlink control channel structures for low latency applications in accordance with various aspects of the present disclosure. The base station DL control manager 1315 may be an example of aspects of a base station DL control manager 1415 described with reference to FIGS. 11, 12, and 14. The base station DL control manager 1315 may include control message component 1320, data transmitter 1325, and DL grant component 1330. Each of these modules may communicate, directly or indirectly, with one another (e.g., via one or more buses).

Control message component 1320 may transmit a first control message within a control region of a first TTI that has a first duration, where the control region of the first TTI includes an indication to be used by a UE to identify a data region within the first TTI, transmit a second control message within a control region of the second TTI, where the second control message includes a grant of resources for the transmitted data in the data region of the second TTI, and where a location of the control region of the second TTI is indicated in the first control message.

Furthermore, in some cases, control message component 1320 may transmit a control message within a control region of the TTI, where the control message includes the downlink resource grant at a first position of the control region that is defined relative to a first boundary of the control region and the uplink resource grant at a second position of the control region that is defined relative to a second boundary of the control region, generate a control message for a first data region and a second data region of a TTI, where the control message includes one or more resource allocation bits to be used by a UE to determine that the first data region and the second data region are allocated to the UE, and transmit the control message in a control region of a first resource element block of the TTI.

Data transmitter 1325 may transmit data in a data region of a second TTI that has a second duration that is less than the first duration, where the first TTI and the second TTI at least partially overlap in time, where the data region of the first TTI is frequency division multiplexed with the data region of the second TTI, and where the control region of the second TTI is frequency division multiplexed with the data region of the second TTI and transmit, based on the one or more resource allocation bits, data in the first data region of the first resource element block of the TTI and data in the second data region of a second resource element block of the TTI.

DL grant component 1330 may generate a downlink resource grant that indicates resources assigned to a UE in a data region of a TTI and generate an uplink resource grant for the UE.

Figure 14:
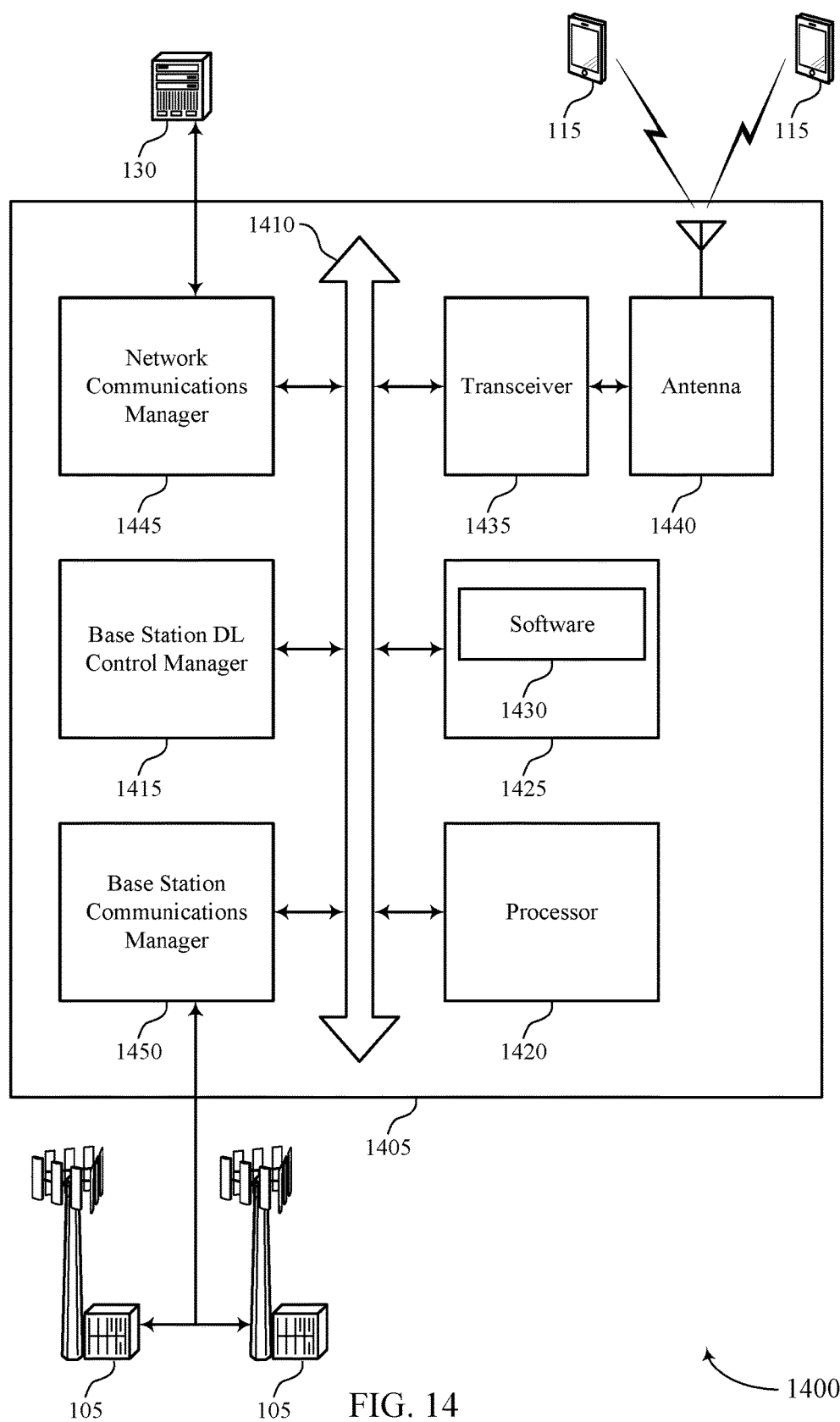
FIG. 14 illustrates a block diagram of a system including a base station that supports downlink control channel structures for low latency applications in accordance with aspects of the present disclosure.

FIG. 14 shows a diagram of a system 1400 including a device 1405 that supports downlink control channel structures for low latency applications in accordance with various aspects of the present disclosure. Device 1405 may be an example of or include the components of base station 105 as described above, e.g., with reference to FIG. 1. Device 1405 may include components for bi-directional voice and data communications including components for transmitting and receiving communications, including base station DL control manager 1415, processor 1420, memory 1425, software 1430, transceiver 1435, antenna 1440, network communications manager 1445, and base station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting downlink control channel structure for low latency applications).1420.

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support downlink control channel structure for low latency applications. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Base station communications manager 1450 may manage communications with other base station 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide a X2 interface within a LTE/LTE-A wireless communication network technology to provide communication between base stations 105.

Figure 15:
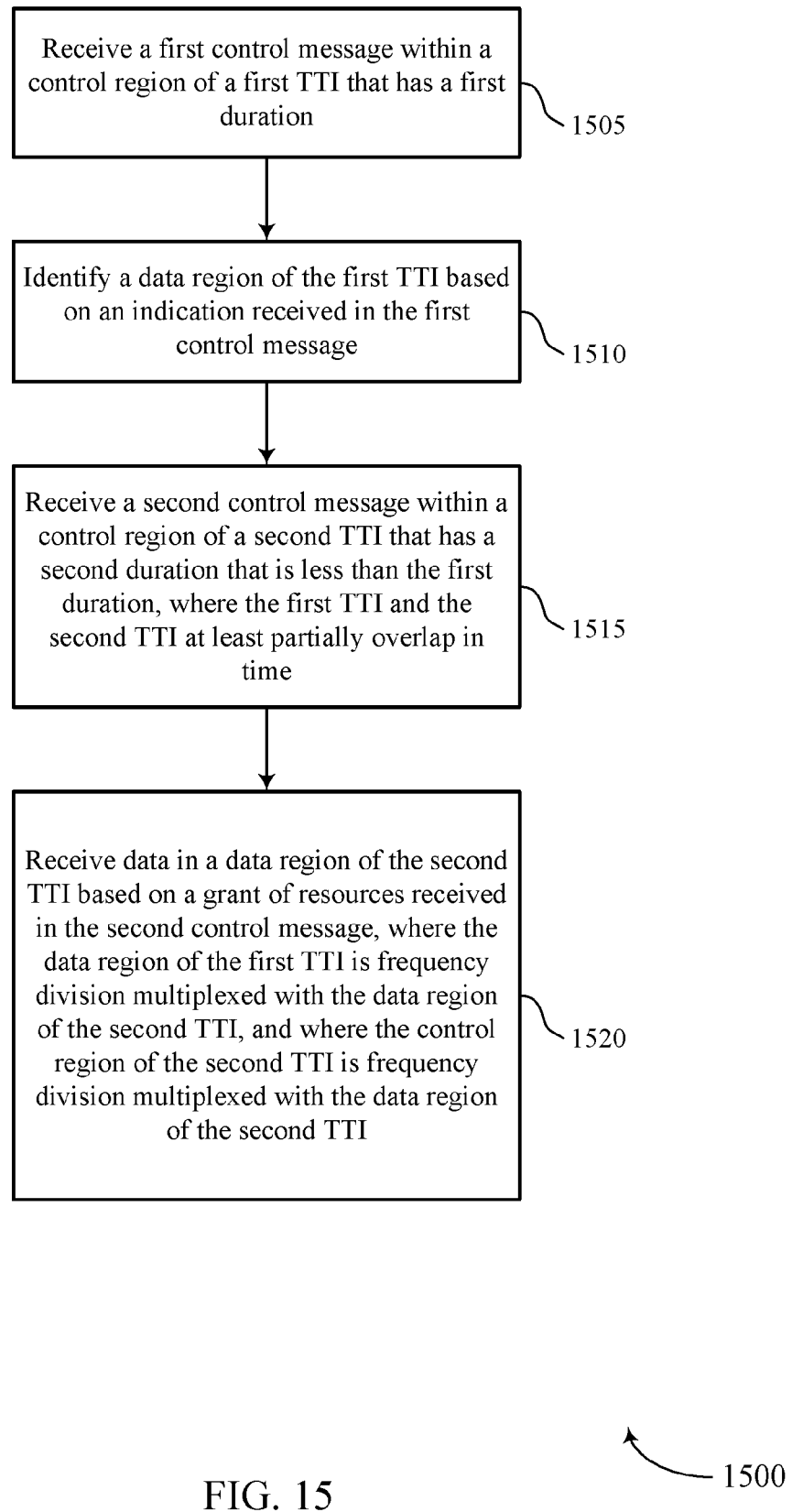
FIGS. 15 through 20 illustrate methods for downlink control channel structures for low latency applications in accordance with aspects of the present disclosure.

FIG. 15 shows a flowchart illustrating a method 1500 for downlink control channel structures for low latency applications in accordance with various aspects of the present disclosure. The operations of method 1500 may be implemented by a UE 115 or its components as described herein. For example, the operations of method 1500 may be performed by a UE DL control manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive a first control message within a control region of a first TTI that has a first duration. The operations of block 1505 may be performed according to the methods described with reference to FIGS. 1 through 6. In certain examples, aspects of the operations of block 1505 may be performed by a control message component as described with reference to FIGS. 7 through 10.

At block 1510 the UE 115 may identify a data region of the first TTI based at least in part on an indication received in the first control message. The operations of block 1510 may be performed according to the methods described with reference to FIGS. 1 through 6. In certain examples, aspects of the operations of block 1510 may be performed by a data region identifier as described with reference to FIGS. 7 through 10.

At block 1515 the UE 115 may receive a second control message within a control region of a second TTI that has a second duration that is less than the first duration, wherein the first TTI and the second TTI at least partially overlap in time. The operations of block 1515 may be performed according to the methods described with reference to FIGS. 1 through 6. In certain examples, aspects of the operations of block 1515 may be performed by a control message component as described with reference to FIGS. 7 through 10.

At block 1520 the UE 115 may receive data in a data region of the second TTI based at least in part on a grant of resources received in the second control message, wherein the data region of the first TTI is frequency division multiplexed with the data region of the second TTI, and wherein the control region of the second TTI is frequency division multiplexed with the data region of the second TTI. The operations of block 1520 may be performed according to the methods described with reference to FIGS. 1 through 6. In certain examples, aspects of the operations of block 1520 may be performed by a data receiver as described with reference to FIGS. 7 through 10.

Figure 16:
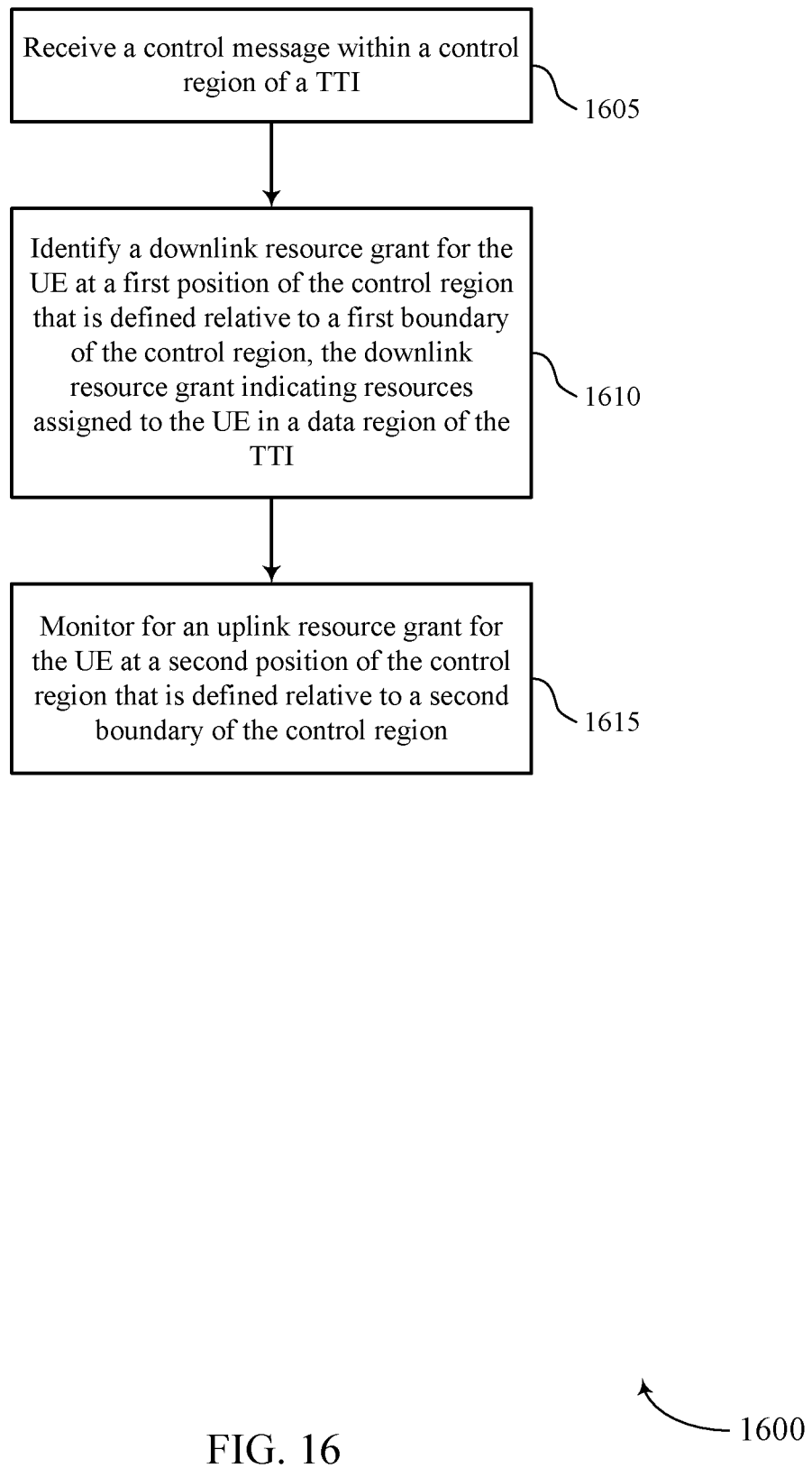

FIG. 16 shows a flowchart illustrating a method 1600 for downlink control channel structures for low latency applications in accordance with various aspects of the present disclosure. The operations of method 1600 may be implemented by a UE 115 or its components as described herein. For example, the operations of method 1600 may be performed by a UE DL control manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a control message within a control region of a TTI. The operations of block 1605 may be performed according to the methods described with reference to FIGS. 1 through 6. In certain examples, aspects of the operations of block 1605 may be performed by a control message component as described with reference to FIGS. 7 through 10.

At block 1610 the UE 115 may identify a downlink resource grant for the UE 115 at a first position of the control region that is defined relative to a first boundary of the control region, the downlink resource grant indicating resources assigned to the UE in a data region of the TTI. The operations of block 1610 may be performed according to the methods described with reference to FIGS. 1 through 6. In certain examples, aspects of the operations of block 1610 may be performed by a DL grant component as described with reference to FIGS. 7 through 10.

At block 1615 the UE 115 may monitor for an uplink resource grant for the UE 115 at a second position of the control region that is defined relative to a second boundary of the control region. The operations of block 1615 may be performed according to the methods described with reference to FIGS. 1 through 6. In certain examples, aspects of the operations of block 1615 may be performed by a grant monitoring component as described with reference to FIGS. 7 through 10.

Figure 17:
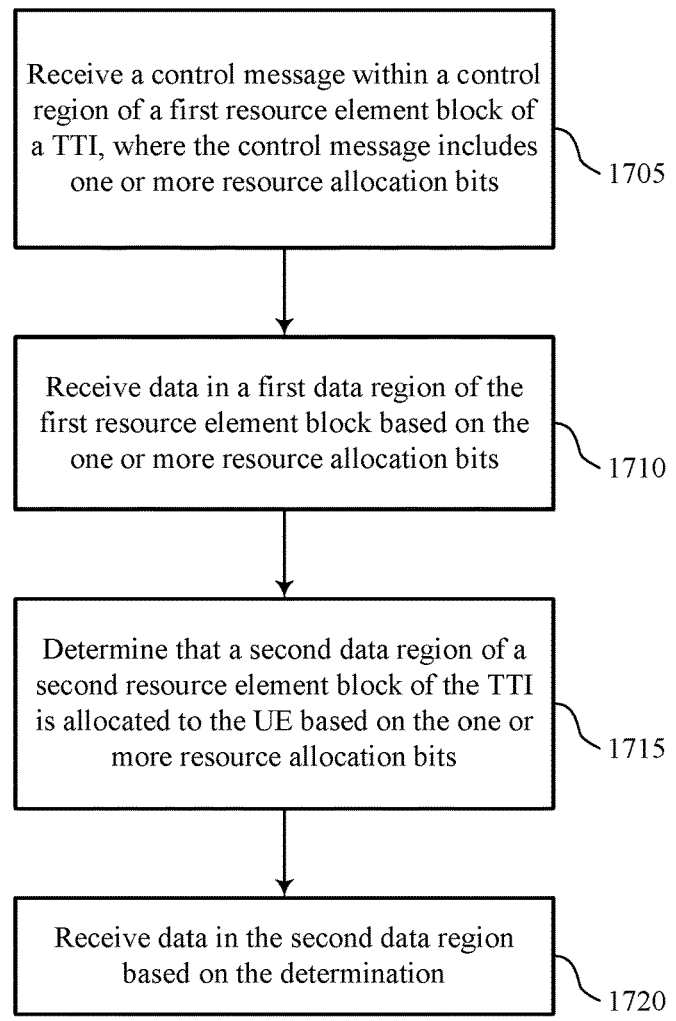

FIG. 17 shows a flowchart illustrating a method 1700 for downlink control channel structures for low latency applications in accordance with various aspects of the present disclosure. The operations of method 1700 may be implemented by a UE 115 or its components as described herein. For example, the operations of method 1700 may be performed by a UE DL control manager as described with reference to FIGS. 7 through 10. In some examples, a UE 115 may execute a set of codes to control the functional elements of the device to perform the functions described below. Additionally or alternatively, the UE 115 may perform aspects the functions described below using special-purpose hardware.

At block 1705 the UE 115 may receive a control message within a control region of a first resource element block of a TTI, wherein the control message includes one or more resource allocation bits. The operations of block 1705 may be performed according to the methods described with reference to FIGS. 1 through 6. In certain examples, aspects of the operations of block 1705 may be performed by a control message component as described with reference to FIGS. 7 through 10.

At block 1710 the UE 115 may receive data in a first data region of the first resource element block based at least in part on the one or more resource allocation bits. The operations of block 1710 may be performed according to the methods described with reference to FIGS. 1 through 6. In certain examples, aspects of the operations of block 1710 may be performed by a data receiver as described with reference to FIGS. 7 through 10.

At block 1715 the UE 115 may determine that a second data region of a second resource element block of the TTI is allocated to the UE based at least in part on the one or more resource allocation bits. The operations of block 1715 may be performed according to the methods described with reference to FIGS. 1 through 6. In certain examples, aspects of the operations of block 1715 may be performed by a data region identifier as described with reference to FIGS. 7 through 10.

At block 1720 the UE 115 may receive data in the second data region based at least in part on the determination. The operations of block 1720 may be performed according to the methods described with reference to FIGS. 1 through 6. In certain examples, aspects of the operations of block 1720 may be performed by a data receiver as described with reference to FIGS. 7 through 10.

Figure 18:
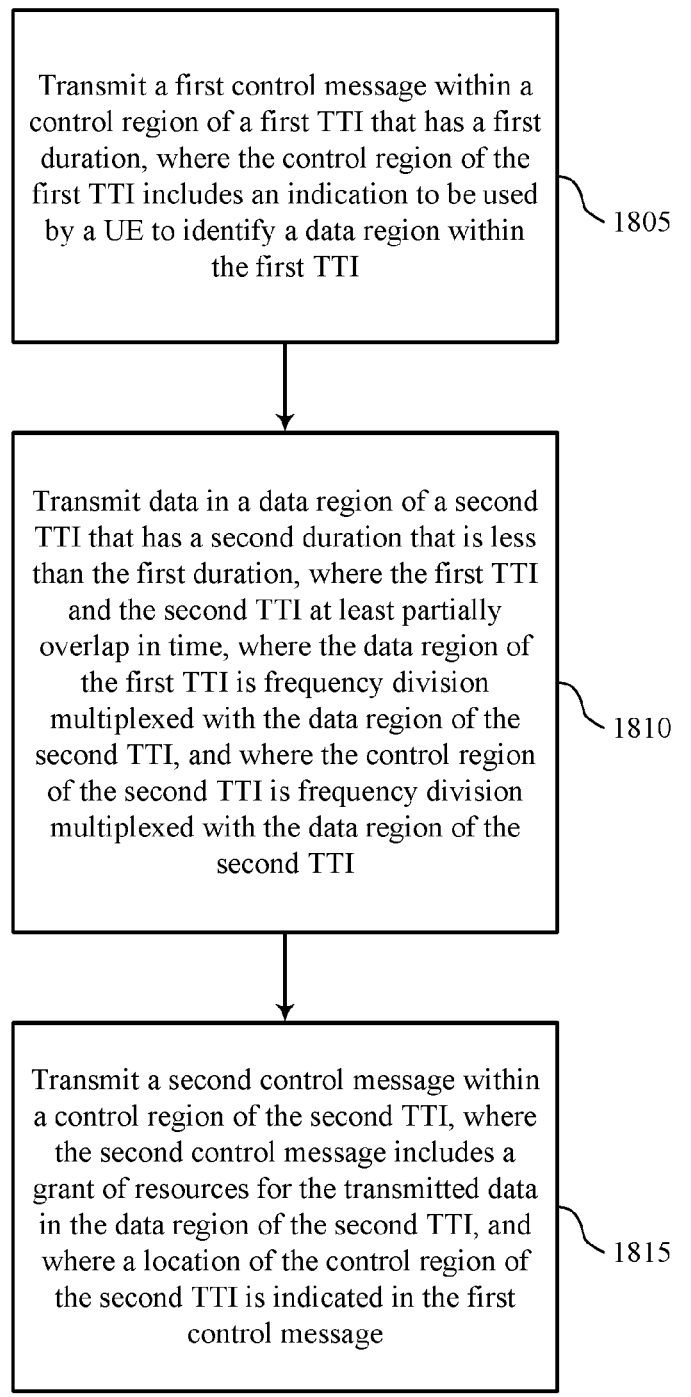

FIG. 18 shows a flowchart illustrating a method 1800 for downlink control channel structures for low latency applications in accordance with various aspects of the present disclosure. The operations of method 1800 may be implemented by a base station 105 or its components as described herein. For example, the operations of method 1800 may be performed by a base station DL control manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit a first control message within a control region of a first TTI that has a first duration, wherein the control region of the first TTI includes an indication to be used by a UE to identify a data region within the first TTI. The operations of block 1805 may be performed according to the methods described with reference to FIGS. 1 through 6. In certain examples, aspects of the operations of block 1805 may be performed by a control message component as described with reference to FIGS. 11 through 14.

At block 1810 the base station 105 may transmit data in a data region of a second TTI that has a second duration that is less than the first duration, wherein the first TTI and the second TTI at least partially overlap in time, wherein the data region of the first TTI is frequency division multiplexed with the data region of the second TTI, and wherein the control region of the second TTI is frequency division multiplexed with the data region of the second TTI. The operations of block 1810 may be performed according to the methods described with reference to FIGS. 1 through 6. In certain examples, aspects of the operations of block 1810 may be performed by a data transmitter as described with reference to FIGS. 11 through 14.

At block 1815 the base station 105 may transmit a second control message within a control region of the second TTI, wherein the second control message includes a grant of resources for the transmitted data in the data region of the second TTI, and wherein a location of the control region of the second TTI is indicated in the first control message. The operations of block 1815 may be performed according to the methods described with reference to FIGS. 1 through 6. In certain examples, aspects of the operations of block 1815 may be performed by a control message component as described with reference to FIGS. 11 through 14.

Figure 19:
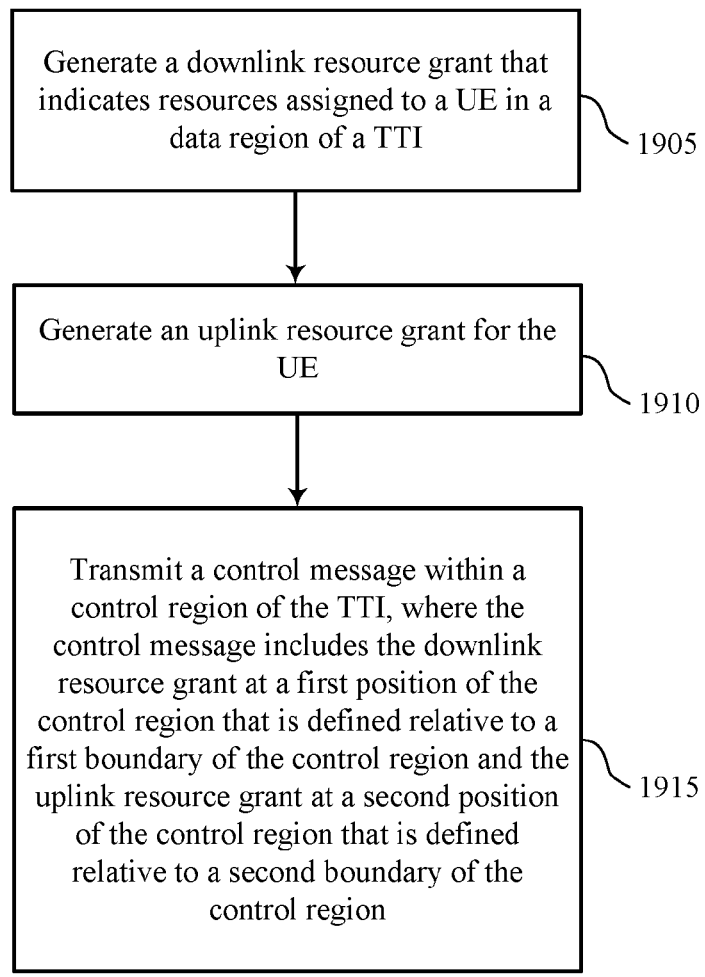

FIG. 19 shows a flowchart illustrating a method 1900 for downlink control channel structures for low latency applications in accordance with various aspects of the present disclosure. The operations of method 1900 may be implemented by a base station 105 or its components as described herein. For example, the operations of method 1900 may be performed by a base station DL control manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may generate a downlink resource grant that indicates resources assigned to a UE in a data region of a TTI. The operations of block 1905 may be performed according to the methods described with reference to FIGS. 1 through 6. In certain examples, aspects of the operations of block 1905 may be performed by a DL grant component as described with reference to FIGS. 11 through 14.

At block 1910 the base station 105 may generate an uplink resource grant for the UE. The operations of block 1910 may be performed according to the methods described with reference to FIGS. 1 through 6. In certain examples, aspects of the operations of block 1910 may be performed by a DL grant component as described with reference to FIGS. 11 through 14.

At block 1915 the base station 105 may transmit a control message within a control region of the TTI, wherein the control message includes the downlink resource grant at a first position of the control region that is defined relative to a first boundary of the control region and the uplink resource grant at a second position of the control region that is defined relative to a second boundary of the control region. The operations of block 1915 may be performed according to the methods described with reference to FIGS. 1 through 6. In certain examples, aspects of the operations of block 1915 may be performed by a control message component as described with reference to FIGS. 11 through 14.

Figure 20:
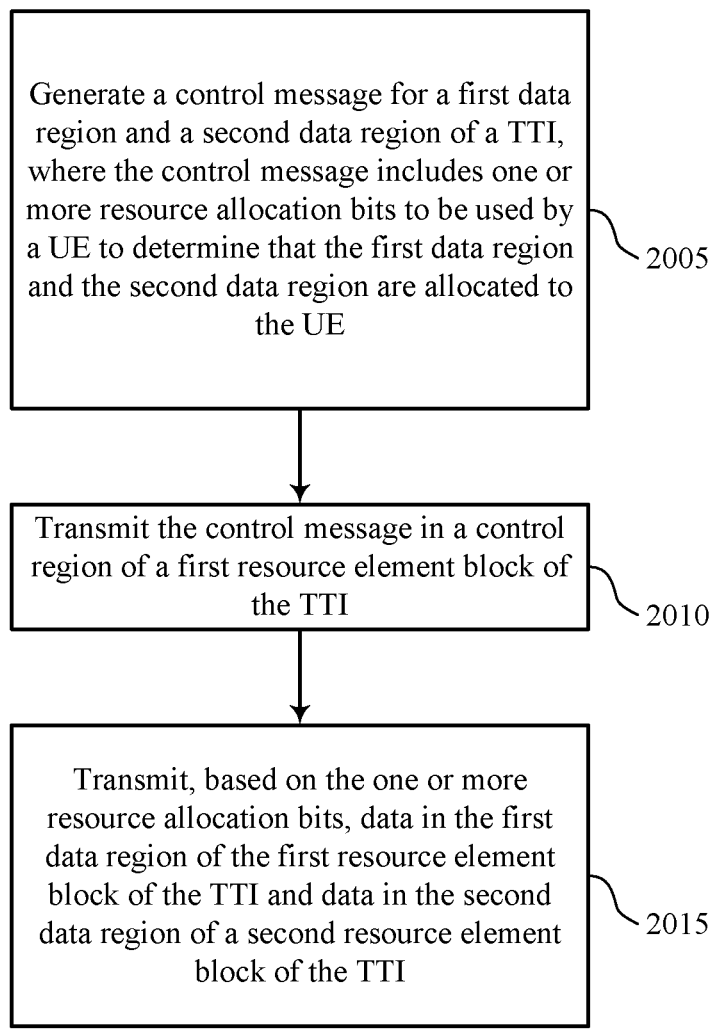

FIG. 20 shows a flowchart illustrating a method 2000 for downlink control channel structures for low latency applications in accordance with various aspects of the present disclosure. The operations of method 2000 may be implemented by a base station 105 or its components as described herein. For example, the operations of method 2000 may be performed by a base station DL control manager as described with reference to FIGS. 11 through 14. In some examples, a base station 105 may execute a set of codes to control the functional elements of the device to perform the functions described below. Additionally or alternatively, the base station 105 may perform aspects the functions described below using special-purpose hardware.

At block 2005 the base station 105 may generate a control message for a first data region and a second data region of a TTI, wherein the control message includes one or more resource allocation bits to be used by a UE to determine that the first data region and the second data region are allocated to the UE. The operations of block 2005 may be performed according to the methods described with reference to FIGS. 1 through 6. In certain examples, aspects of the operations of block 2005 may be performed by a control message component as described with reference to FIGS. 11 through 14.

At block 2010 the base station 105 may transmit the control message in a control region of a first resource element block of the TTI. The operations of block 2010 may be performed according to the methods described with reference to FIGS. 1 through 6. In certain examples, aspects of the operations of block 2010 may be performed by a control message component as described with reference to FIGS. 11 through 14.

At block 2015 the base station 105 may transmit, based at least in part on the one or more resource allocation bits, data in the first data region of the first resource element block of the TTI and data in the second data region of a second resource element block of the TTI. The operations of block 2015 may be performed according to the methods described with reference to FIGS. 1 through 6. In certain examples, aspects of the operations of block 2015 may be performed by a data transmitter as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects a LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

What is claimed is:

1. A method for wireless communication, comprising:
   receiving a control message within a control region of a transmission time interval (TTI);
   identifying a downlink resource grant for a user equipment (UE) at a first position of the control region that is defined relative to a first boundary of the control region, the downlink resource grant indicating resources assigned to the UE in a data region of the TTI; and
   monitoring for an uplink resource grant for the UE at a second position of the control region that is defined relative to a second boundary of the control region, the downlink resource grant and the uplink resource grant separated by at least a portion of the data region.

2. The method of claim 1, wherein:
   the first boundary comprises a logical starting point of the control region relative to the TTI; and
   the second boundary comprises a logical end point of the control region relative to the TTI.

3. The method of claim 1, further comprising:
   receiving in the downlink resource grant an uplink grant position indicator that indicates the second position of the control region; and
   identifying the second position of the control region based at least in part on the uplink grant position indicator.

4. The method of claim 3, wherein the downlink resource grant includes an information field that comprises the uplink grant position indicator.

5. The method of claim 1, further comprising:
   identifying the portion of the data region, wherein the portion of the data region is between the first position and the second position of the control region.

6. The method of claim 1, wherein monitoring for the uplink resource grant for the UE comprises:
   monitoring for the uplink resource grant for the UE at one or more additional positions defined relative to the second boundary of the control region or the second position.

7. The method of claim 1, further comprising:
   determining an aggregation level associated with the control region; and
   monitoring for the uplink resource grant within the control region based at least in part oil the aggregation level.

8. A method for wireless communication, comprising:
   generating a downlink resource grant that indicates resources assigned to a user equipment (UE) in a data region of a transmission time interval (TTI);
   generating an uplink resource grant for the UE; and
   transmitting, within a control region of the TTI, a control message that includes the downlink resource grant and the uplink resource grant separated by at least a portion of the data region, the downlink resource grant at a first position of the control region that is defined relative to a first boundary of the control region and the uplink resource grant at a second position of the control region that is defined relative to a second boundary of the control region.

9. An apparatus for wireless communication, in a system comprising:
   a processor;
   memory in electronic communication with the processor; and
   instructions stored in the memory and operable, when executed by the processor, to cause the apparatus to:
      receive a control message within a control region of a transmission time interval (TTI);
      identify a downlink resource grant for a user equipment (UE) at a first position of the control region that is defined relative to a first boundary of the control region, the downlink resource grant indicating resources assigned to the UE in a data region of the TTI; and
      monitor for an uplink resource grant for the UE at a second position of the control region that is defined relative to a second boundary of the control region, the downlink resource grant and the uplink resource grant separated by at least a portion of the data region.

10. The apparatus of claim 9, wherein:
    the first boundary comprises a logical starting point of the control region relative to the TTI; and
    the second boundary comprises a logical end point of the control region relative to the TTI.

11. The apparatus of claim 9, wherein the instructions stored in the memory are further operable to cause the apparatus to:
    receive in the downlink resource grant an uplink grant position indicator that indicates the second position of the control region; and
    identify the second position of the control region based at least in part on the uplink grant position indicator.

12. The apparatus of claim 11, wherein the downlink resource grant includes an information field that comprises the uplink grant position indicator.

13. The apparatus of claim 9, wherein the instructions stored in the memory are further operable to cause the apparatus to:
    identify the portion of the data region, wherein the portion of the data region is between the first position and the second position of the control region.

14. The apparatus of claim 9, wherein monitoring for the uplink resource grant for the UE comprises:
monitoring for the uplink resource grant for the UE at one or more additional positions defined relative to the second boundary of the control region or the second position.

15. The apparatus of claim 9, wherein the instructions stored in the memory are further operable to cause the apparatus to:
determine an aggregation level associated with the control region; and
monitor for the uplink resource grant within the control region based at least in part on the aggregation level.

16. An apparatus for wireless communication, in a system comprising:
a processor;
memory in electronic communication with the processor, and
instructions stored in the memory and operable, when executed by the processor, to cause the apparatus to:
generate a downlink resource grant that indicates resources assigned to a user equipment (UE) in a data region of a transmission time interval (TTI)
generate an uplink resource grant for the UE; and
transmit, within a control region of the TTI, a control message that includes the downlink resource grant and the uplink resource grant separated by at least a portion of the data region, the downlink resource grant at a first position of the control region that is defined relative to a first boundary of the control region and the uplink resource grant at a second position of the control region that is defined relative to a second boundary of the control region.

17. An apparatus for wireless communication, comprising:
means for receiving a control message within a control region of a transmission time interval (TTI);
means for identifying a downlink resource grant for a user equipment (UE) at a first position of the control region that is defined relative to a first boundary of the control region, the downlink resource grant indicating resources assigned to the UE in a data region of the TTI; and
means for monitoring for an uplink resource grant for the UE at a second position of the control region that is defined relative to a second boundary of the control region, the downlink resource grant and the uplink resource grant separated by at least a portion of the data region.

18. The apparatus of claim 17, wherein:
the first boundary comprises a logical starting point of the control region relative to the TTI; and
the second boundary comprises a logical end point of the control region relative to the TTI.

19. The apparatus of claim 17, further comprising:
means for receiving in the downlink resource grant an uplink grant position indicator that indicates the second position of the control region; and
means for identifying the second position of the control region based at least in part on the uplink grant position indicator.

20. The apparatus of claim 17, further comprising:
means for identifying the portion of the data region, wherein the portion of the data region is between the first position and the second position of the control region.

21. The apparatus of claim 17, wherein the means for monitoring for the uplink resource grant for the UE comprises:
means for monitoring for the uplink resource grant for the UE at one or more additional positions defined relative to the second boundary of the control region or the second position.

22. The apparatus of claim 17, further comprising:
means for determining an aggregation level associated with the control region; and
means for monitoring for the uplink resource grant within the control region based at least in part on the aggregation level.

23. An apparatus for wireless communication, comprising:
means for generating a downlink resource grant that indicates resources assigned to a user equipment (UE) in a data region of a transmission time interval (TTI);
means for generating an uplink resource grant for the UE; and
means for transmitting, within a control region of the TTI, a control message that includes the downlink resource grant and the uplink resource grant separated by at least a portion of the data region, the downlink resource grant at a first position of the control region that is defined relative to a first boundary of the control region and the uplink resource grant at a second position of the control region that is defined relative to a second boundary of the control region.

24. A non-transitory computer readable medium storing code for wireless communication, the code comprising instructions executable by a processor to:
receive a control message within a control region of a transmission time interval (TTI);
identify a downlink resource grant for a user equipment (UE) at a first position of the control region that is defined relative to a first boundary of the control region, the downlink resource grant indicating resources assigned to the UE in a data region of the TTI; and
monitor for an uplink resource grant for the UE at a second position of the control region that is defined relative to a second boundary of the control region, the downlink resource grant and the uplink resource grant separated by at least a portion of the data region.

25. A non-transitory computer readable medium storing code for wireless communication, the code comprising instructions executable to:
generate a downlink resource grant that indicates resources assigned to a user equipment (UE) in a data region of a transmission time interval (TTI);
generate an uplink resource grant for the UE; and
transmit, within a control region of the TTI, a control message that includes the downlink resource grant and the uplink resource grant separated by at least a portion of the data region, the downlink resource grant at a first position of the control region that is defined relative to a first boundary of the control region and the uplink resource grant at a second position of the control region that is defined relative to a second boundary of the control region.

\* \* \* \* \*